US007421943B1

(12) United States Patent  (10) Patent No.: US 7,421,943 B1
Temesgen  (45) Date of Patent: Sep. 9, 2008

(54) INJERA BAKING MACHINE

(76) Inventor: Yoseph Temesgen, 3723 White River Dr., Dallas, TX (US) 75287-4815

( * ) Notice: Subject to any disclaimer, the term of this patent is extended or adjusted under 35 U.S.C. 154(b) by 741 days.

(21) Appl. No.: 11/066,664

(22) Filed: Feb. 25, 2005

(51) Int. Cl.
  *A21D 13/04* (2006.01)
  *A47J 37/00* (2006.01)
  *A21B 7/00* (2006.01)
  *B65G 25/04* (2006.01)

(52) U.S. Cl. .............................. 99/423; 99/352; 99/355; 99/357; 426/496; 426/523; 198/468.6; 198/468.7

(58) Field of Classification Search ........................ None
  See application file for complete search history.

(56) References Cited

U.S. PATENT DOCUMENTS

| 4,204,466 | A | * | 5/1980 | Schnee | 99/352 |
| 4,583,451 | A | * | 4/1986 | Kanagy | 99/423 |
| 5,298,273 | A | * | 3/1994 | Ito | 426/549 |
| 5,687,640 | A | * | 11/1997 | Sala | 99/423 |

| 2003/0143309 | A1 | 7/2003 | Kindie et al. |
| 2004/0096556 | A1 | 5/2004 | Admassu |

\* cited by examiner

*Primary Examiner*—Joseph M Pelham

(57) ABSTRACT

An Ethiopian bread-making machine includes a polishing assembly, a batter application assembly, and a reciprocating collection/deposition assembly. The polishing assembly includes a polishing pad which may be positioned over the cooking surface when the cooking surface is not in use. When engaged, the polishing assembly applies the rotating polishing pad to the cooking surface so as to clean it prior to applying bread batter to the cooking surface. The batter application assembly is also positionable over the cooking surface, and includes a drive to rotate a batter supply line reciprocating nozzle carrier so that the batter is poured onto the cooking surface along an inwardly spiral path so as to generate a uniform circular pour of batter. Finally, the reciprocating collection/deposition assembly utilizes a reciprocating conveyor equipped with a spatula and coordinated conveyor rollers so as to remove the cooked bread wafer from the cooking surface at cook completion time for cooling, while simultaneously discharging a previously cooled wafer generated by this fully automated, cyclic process.

20 Claims, 29 Drawing Sheets

INJERA BAKING MACHINE

BACKGROUND OF THE INVENTION

An Unusual Delicacy: Injera

Injera (sometimes spelled enjera) is a staple bread of Ethiopia, an East African country with a population in excess of sixty million people.

This popular form of bread is not only a kind of food; in many ways, it also acts as a utensil to scoop up meat and vegetable stews. Not infrequently, it also lines the tray on which some stews are served, soaking up juices as the meal progresses; then, when the edible tablecloth is eaten, the meal is viewed as being over.

Injera is made using teff, a tiny, round grain that flourishes in the highlands of Ethiopia. While teff is very nutritious, it contains very little gluten (which makes it poorly suited for the making of raised bread). However, it still takes advantage of the inherent properties of yeast, as fermentation lends it an airy, bubbly texture. Injera may be made solely from teff, as it most commonly is in Ethiopia, or it may be made using a combination of teff, wheat, and other substitute flours, as it sometimes is in the United States, yielding a formative batter which is usually slightly thinner than conventional North American pancake mix.

Regardless of the ways in which it is modified around the world, teff-bearing injera constitutes a unique delicacy, and one for which the worldwide demand increases each year.

No Free Lunch: the Arduous Task of Preparing High-Quality Injera.

The process of making injera involves pouring the thin injera batter onto a pre-heated flat baking surface so as to thinly cover the surface. The thinly spread batter bakes to its characteristic thin soft honey comb appearance in about a minute or so.

In contrast to the preparation of pancakes, in which the patty is flipped during cooking, injera sheets are baked on one side only during preparation.

While the initial steps of cooking the injera bread are simple enough for the journeyman cook, after the bread ("injera," a type of bread product, is occasionally referred to as "bread" in this specification) has been sufficiently cooked, it is no small challenge to remove the large, hot, thin wafer from the cooking surface without either tearing it or burning ones fingers. This challenge is further complicated when the bread is being prepared in a commercial establishment, catering to numerous diners, under substantial pressures of time (and money).

Injera is traditionally prepared manually. And the process by which it is prepared usually involves three distinct steps.

First, the hot baking surface upon which it is prepared is optionally polished with a non-stick applicator, so as to prevent the baked injera from sticking to the baking surface.

Second, the batter is rapidly poured onto the flat baking surface, so that the baking surface is fully covered with a thin layer of batter in a short amount of time.

Third, after the injera has baked a sufficient amount of time, it is removed onto a cooling pan. Cooling the injera makes somewhat it easier to handle without risk of a tear and also makes it easier for the diner to enjoy (warm portions being preferable to those which are prohibitively hot or unsatisfyingly cold). Thus, in almost any kitchen, whether a personal kitchen serving a small family or a commercial one serving many diners, each freshly baked injera wafer is frequently set aside to cool in succession in a stack, while its successor cooks on the pan.

An Important Need: an Effective Automatic Injera Baking Machine.

This longstanding manual process, by which countless cooks have prepared injera, merits respect, but, unfortunately, it makes the preparation of this delicacy a time-consuming and labor-intensive process. The repeated human hand contact, in a less than carefully run kitchen, can also be less than completely hygienic.

A variety of attempts have been made at automating the injera baking process. See, e.g., U.S. patent application Ser. No. 10/056,800, U.S. Pat. Appl. Pub. No. 2003-0,143,309, filed Jan. 25, 2002, to M. A. Kindie, R. J. Sweeney, and J. Aitken ("Method and Apparatus for Making Bread"); U.S. patent application Ser. No. 10/298,262, U.S. Pat. Appl. Pub. No. 2004-0,096,556, filed Nov. 14, 2002, to W. Admassu ("Injera Manufacturing System"). However, none of these prior art attempts have yielded the reliable injera production system, suitable for home or commercial use, described here.

Specifically, to the best of the inventor's knowledge, there are no known systems which provide a design for an integrated, and fully automatic, injera baking system which ensures that the baking surface is clean and non-stick before and after each injera is baked and removed, carefully and consistently removes the injera from the baking surface upon cooking cycle conclusion, and conveniently pre-cools and efficiently stacks the injera wafers for cooling and serving.

It is to the design of just such a system that this specification is directed.

BRIEF SUMMARY OF THE INVENTION

The injera baking machine disclosed herein facilitates the fully automated production of this wonderful delicacy, and, it is believed, may even be profitably be used to prepare breads of other cultures. The means by which the machine accomplishes its intended purpose is the fully automated interaction of a number of critical subassemblies, each of which the inventor believes constitutes a valuable invention in its own right.

Key to the invention's operation are the polishing assembly, the batter application assembly, and the reciprocating collection/deposition assembly.

The polishing assembly comprises a polishing pad which may be positioned over the cooking surface when the cooking surface is not in use. When engaged, the polishing assembly utilizes a novel drive mechanism to apply the rotating polishing pad to the cooking surface so as to clean it prior to the application of the bread batter to the cooking surface.

The batter application assembly is also positionable over the cooking surface, and it comprises a drive to rotate a batter supply line reciprocating nozzle carrier so that the batter is poured onto the cooking surface along a spiral path so as to generate a uniform circular pour of batter.

Finally, a reciprocating collection/deposition assembly utilizes a reciprocating conveyor equipped with a spatula, pickup belt, and coordinated conveyor rollers so as to remove the cooked bread wafer from the cooking surface at cook completion time for cooling while simultaneously discharging a previously cooled wafer generated by this fully automated, cyclic process.

DETAILED DESCRIPTION OF THE PREFERRED EMBODIMENT

Overview of a Continuous, Automated Injera Baking Process

The process of making injera described herein is a continuous, automated process that proceeds through numerous discrete, cyclic stages. Groups of successive stages are typically oriented towards the effectuation of a particular goal and are grouped into cycles.

The cycles may be summarized as follows:
(a) Cycle One: Cooking Surface Polish Cycle;
(b) Cycle Two: Batter Application;
(c) Cycle Three: Injera Baking;
(d) Cycle Four: Injera Collection/Deposition; and
(e) Cycle Five: Injera Cooling.

Cycle One: Cooking Surface Polish Cycle.

Turning to the figures, and, specifically, to FIG. 1 through FIG. 6, the invention, as it appears during the stages associated with Cycle One, the cooking surface polish cycle (or, simply, the "polish cycle"), are shown.

Figure 1:
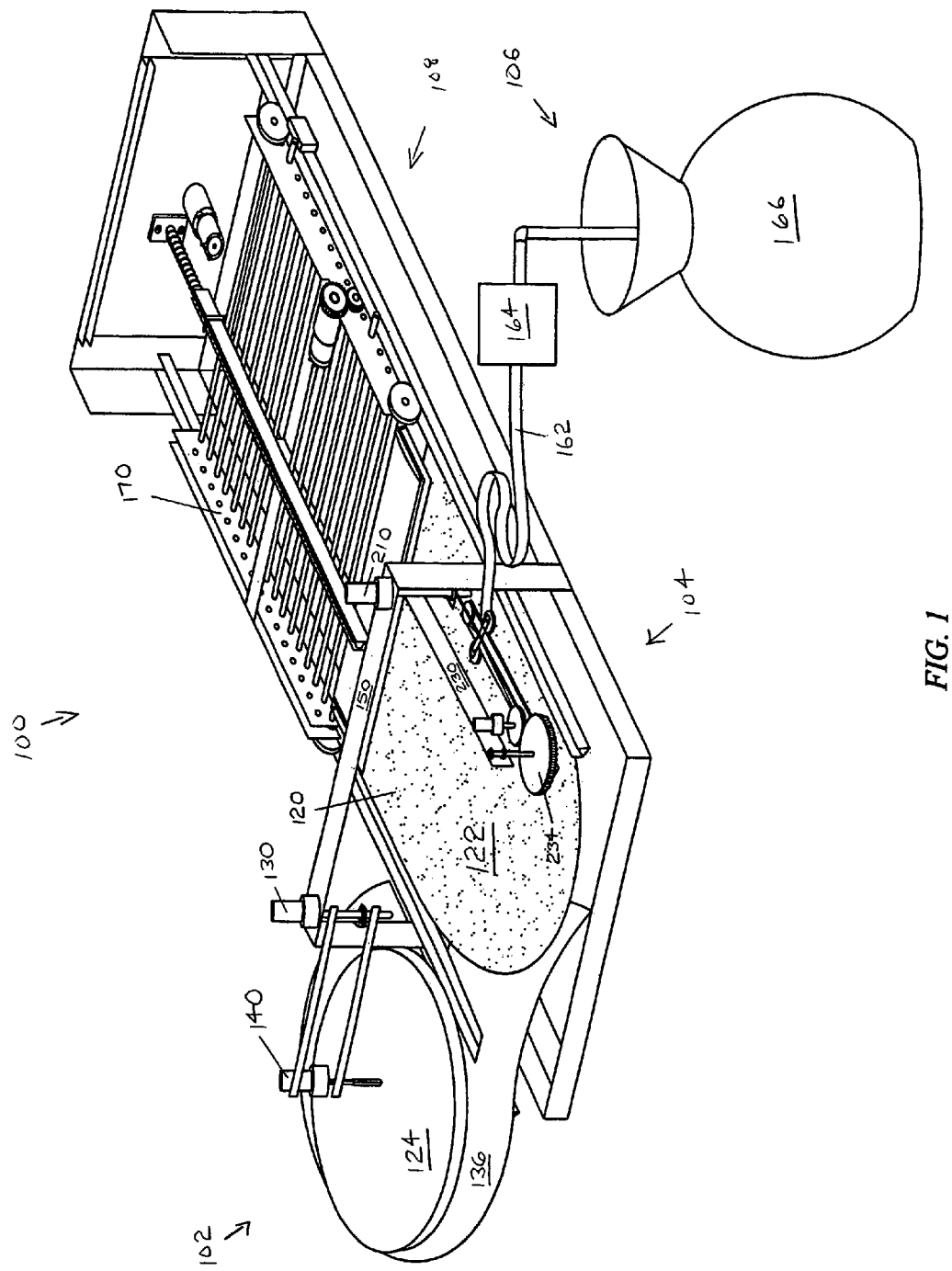
FIG. 1 presents a perspective view of the invention.

Turning, now, specifically, to FIG. 1, a perspective view of the invention 100 is shown.

Several assemblies are apparent in this figure. As described in greater detail hereinbelow, the invention 100 comprises a polishing pad assembly 102, a batter spreading assembly 104, a batter supply assembly 106, and a conveyor assembly 108.

Of particular interest in this view of the invention, from the standpoint of the polish cycle, are, of course, the pan 120, cooking surface 122, pad/spreader mounting frame 150, the polishing pad 124, the polishing pad positioning motor 130, and the polishing pad spinning (or drive) motor 140.

Also apparent in the figure, although not directly relevant to the discussion of this cycle, are the batter reservoir 166, the batter metering pump 164, the batter supply line 162, and the conveyor 170.

Returning to the discussion of the polish cycle, the invention of course comprises the pan 120, which, in turn, comprises a non-stick cooking surface 122. The pan 120 may be circular (or semi-circular as shown in FIG. 1). The key is for the non-stick cooking surface 122 to bear a sufficient area for the circular pour of batter 160 necessary to manufacture the injera 180.

The pad/spreader mounting frame 150 provides overhead support for important subassemblies described herein. For example, as shown it supports the polishing pad positioning motor 130, the motor which moves the polishing pad 124 into and out of polishing (or, cooking surface cleaning) position. When the polishing pad 124 is in the polishing position, it is polishing pad spinning motor 140 which spins the pad so as to clean the cooking surface 122.

This cooking surface cleaning step contributes greatly to the quality of the injera 180 subsequently produced. Specifically, when the cooking surface 122 is clean and free of baked particles of injera 180, the batter 160 then smoothly and completely covers the cooking surface 122, bakes evenly, and produces an injera wafer 180 which is subsequently lifted and transported with ease.

At the moment, however, in FIG. 1, the polishing pad 124 is shown resting on the polishing pad landing 136.

Figure 2:
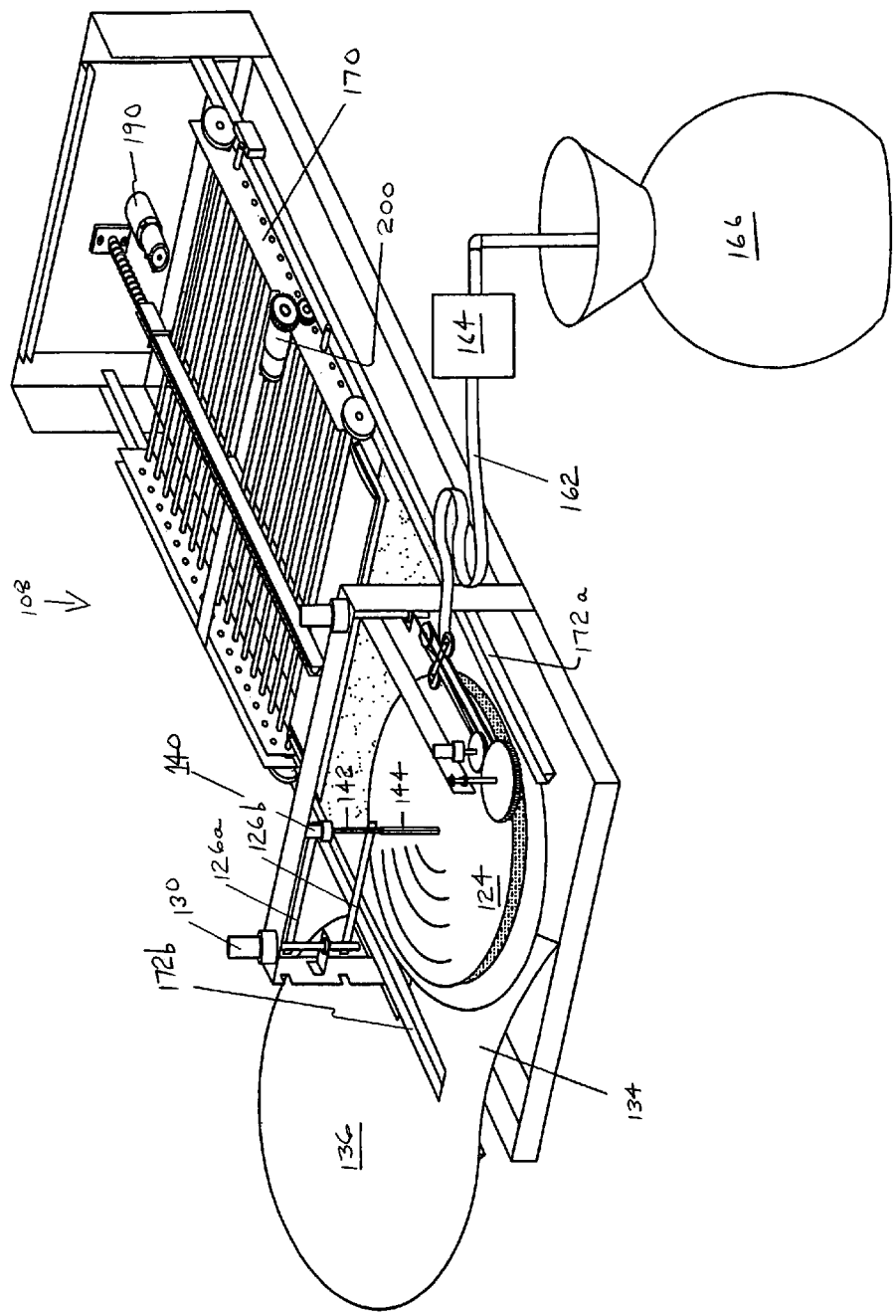
FIG. 2 presents a perspective view of the invention during cooking surface cleaning.

Turning, now, to FIG. 2, a perspective view of the invention 100, during cooking surface cleaning, is shown.

At this point in time, the polishing pad 124 has been swiveled into position over the cooking surface 122. Notice that, during this cycle of the process, the conveyor assembly 108 is in a rearward location; this assembly (which includes a push-pull drive motor 190 and a roller drive motor 200 as described hereinbelow) will move forward at a later stage in the process.

As soon as polishing pad 124 is in position, the polishing pad spinning motor 140 (also known as the polishing pad drive motor 140) runs for a period of time so as to clean the cooking surface 122. This would not be expected to be a time-consuming process and should take from fifteen to thirty seconds, perhaps less.

At this point, after polishing pad spinning motor 140 has come to a full and complete stop, the polishing pad positioning motor 130 is run in the reverse direction (clockwise as viewed from above in FIG. 2) so as to move the polishing pad 124 off the baking surface 122.

As stated, at a subsequent stage in the injera creation process, the conveyor assembly 108 and its conveyor 170 will travel forward (i.e., towards the cooking surface 122). This occurs so that the conveyor assembly 108 can "scoop up" the injera 180 and remove it from the baking surface 122. In order for the conveyor assembly 108 to accomplish this, the conveyor 170 must be positioned slightly above the cooking surface 122; thus, the conveyor tracks (also known as the conveyor wheel tracks or wheel tracks) 172a, 172b are raised slightly above the baking surface.

The position of the conveyor tracks 172a, 172b, and, in particular, the position of conveyor track 172b, could impede movement of the polishing pad 124 off the cooking surface 122 and onto polishing pad landing 136.

To remedy this problem, the polishing pad drive motor shaft 142 has a telescoping extension 144 that allows it to gravitationally extend in length when it is positioned over the baking surface and retract in length while the polishing pad 124 is being swiveled up the polishing pad ramp 134 and onto the polishing pad landing 136.

Figure 3:
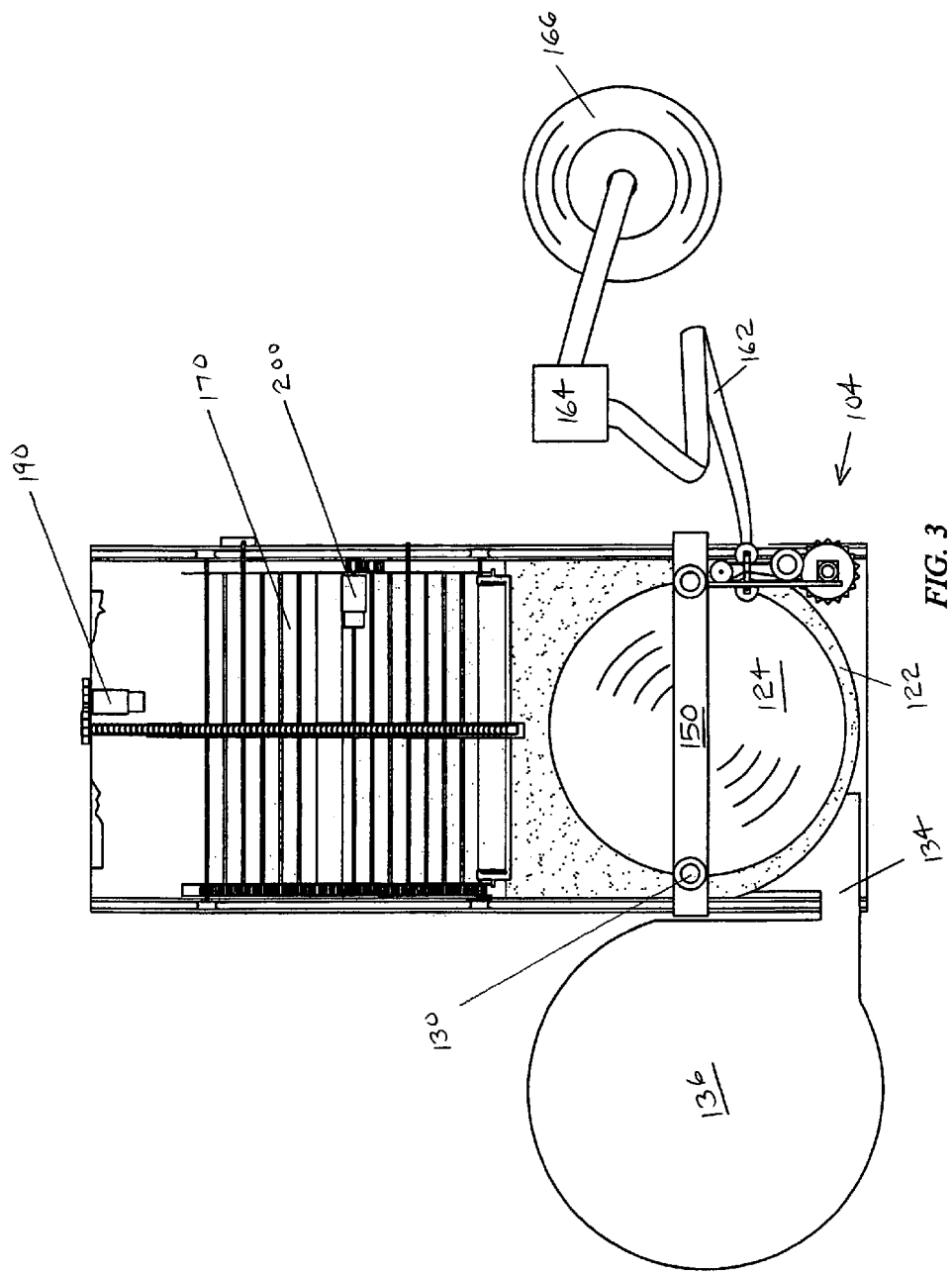
FIG. 3 presents a top view of the invention during cooking surface cleaning.

FIG. 3 provides an alternative view of the invention at this stage of the process. In particular, it shows a top view of the invention. Notice, in particular, the position of the polishing pad 124 over the cooking surface 122 (covering nearly all, and certainly all of the functionally important portions, of the cooking surface 122).

Figure 4:
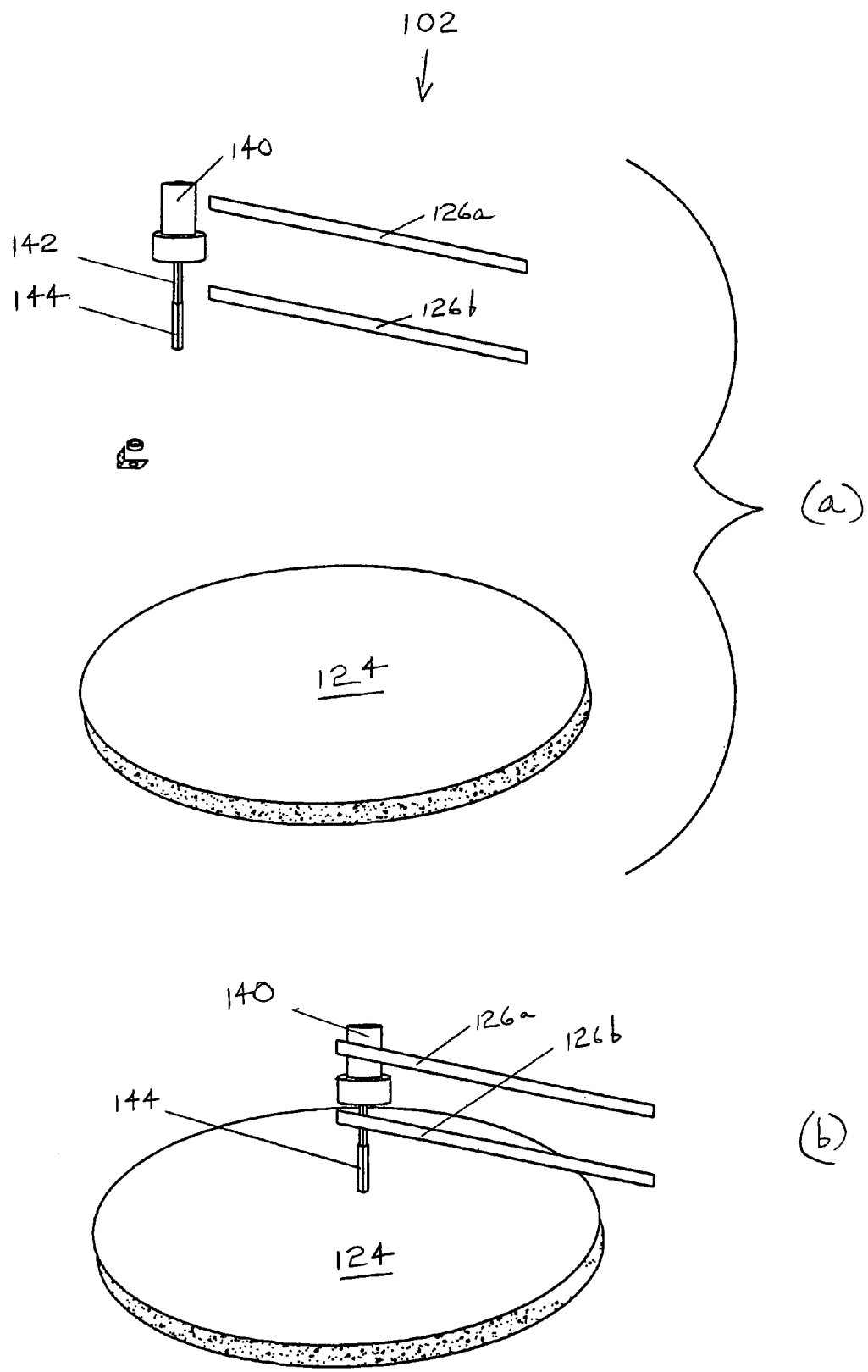
FIG. 4 presents views of the components of the polishing pad assembly.

FIG. 4 likewise provides useful clarification regarding the components of the polishing pad assembly 102.

In section (a) of FIG. 4, several of these components are shown in a disassembled state. Notice, first, the polishing pad spinning motor 140, which is supported by the polishing pad positioning arms 126a, 126b. Notice, as well, that the polishing pad spinning motor 140 drives a polishing pad spinning motor shaft 142 which is connected to a telescopic arm 144.

An inspection of section (b) of FIG. 4 clarifies why this is so: it is the telescopic arm 144 which, as described hereinabove, enables the polishing pad 124 to be lowered (during cleaning of the cooking surface 122) and raised (when the polishing pad 124 is moved onto the polishing pad landing 136).

Figure 5:
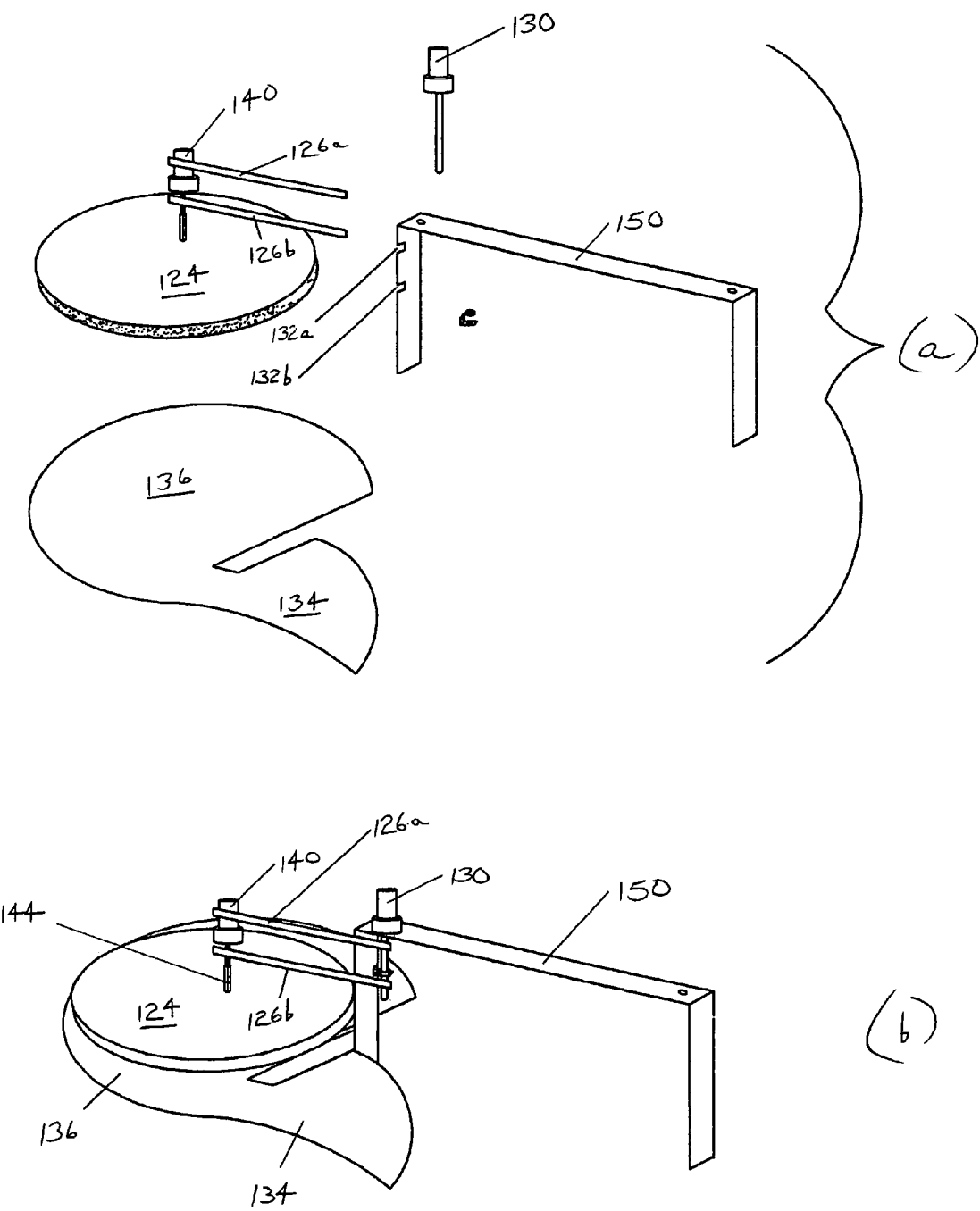
FIG. 5 presents additional views of the components of the polishing pad assembly.

Turning, now, to FIG. 5, additional aspects of the polishing assembly 102 become apparent.

In section (a) of FIG. 5, for example, the polishing assembly 102 is shown in a partially disassembled state. Notice, in particular, the polishing pad positioning motor 130, which is supported on the pad/spreader mounting frame 150, and its proximate relation to the polishing pad positioning arms 126a, 126b. Notice, as well, the polishing pad ramp 134, polishing pad landing 136, and the notches 132a, 132b.

Section (b) of FIG. 5 clarifies the interplay of these components. In particular, it clarifies that, after sliding up the polishing pad ramp 134, the polishing pad 124 comes to rest on the polishing pad landing 136. In order that the polishing pad 124 be fully swiveled into position, notches 132a, 132b are utilized so as to receive the fully rotated polishing pad positioning arms 126a, 126b.

Figure 6:
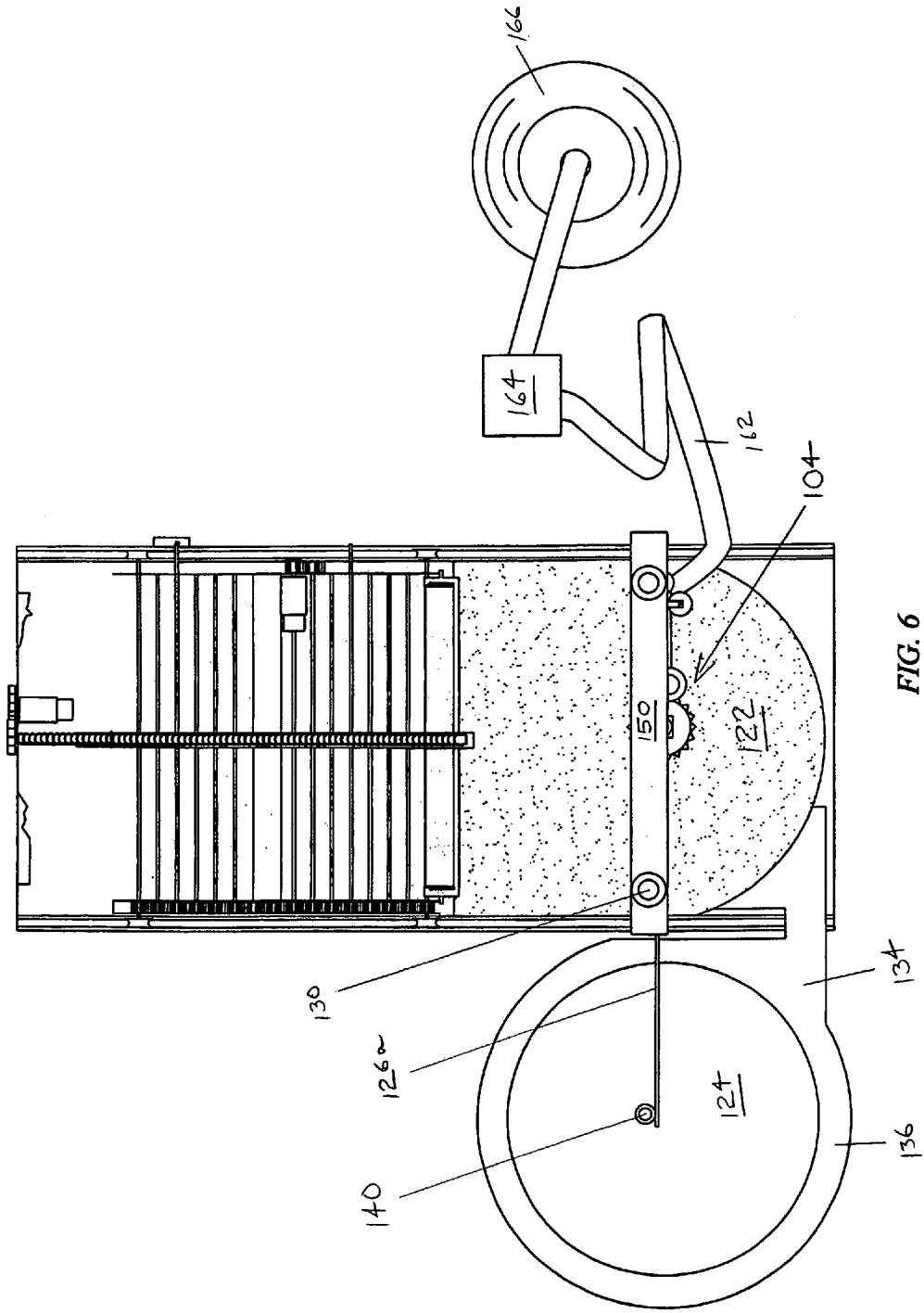
FIG. 6 presents a top view of the invention at a stage at which the machine is ready to commence the application of the batter to the cooking surface.

Turning, now, to FIG. 6, a top view of the invention is shown at an important stage in the process. This stage might be termed the "batter pour ready" stage (or the "ready to pour batter" stage).

Notice two things. First, the polishing pad 124 has been fully swiveled onto the polishing pad landing 136 (leaving behind a clean cooking surface 122). Second, the batter spreading assembly 104 has been swiveled into position, so that the pouring of injera batter 160 can commence.

Cycle Two: Batter Application.

Turning, now, to FIG. 7 through FIG. 15, the invention 100, as it appears during the stages associated with Cycle Two, the batter application cycle (or, alternatively, the "pour cycle"), are shown.

Figure 7:
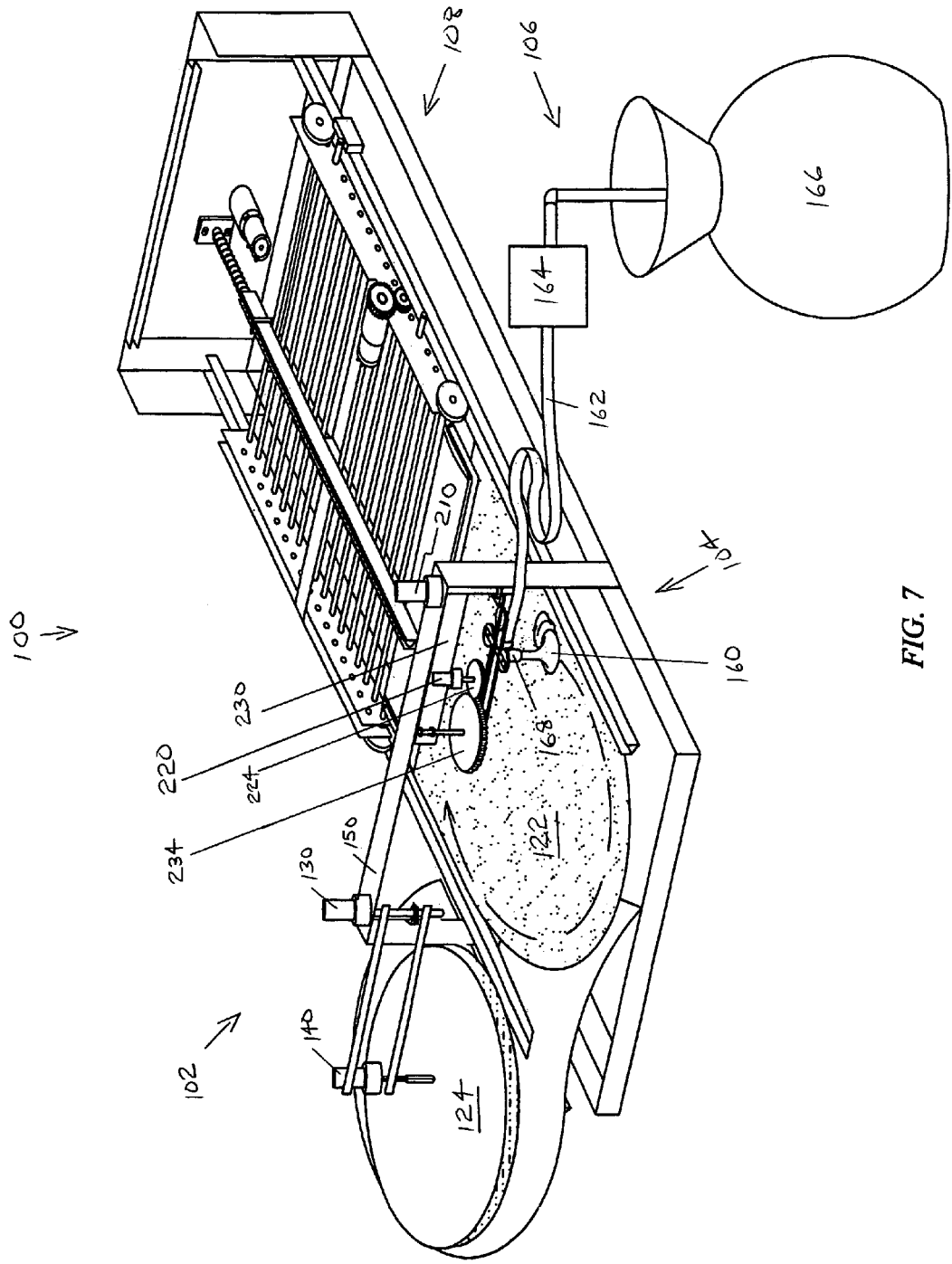
FIG. 7 depicts a perspective view of the invention at the start of the pour cycle.

Turning, now, specifically, to FIG. 7, a perspective view of the invention 100, at the start of the pour cycle, is shown.

Because this is an overview figure, all of the main assemblies of the invention are apparent. In the discussion of the figures relating to Cycle Two, attention is directed primarily to the operation of the batter spreading assembly 104. In this FIG. 7, only a few components of that assembly are clearly identifiable.

For example, the batter spreader positioning motor 210 is depicted. This component swivels the batter spreading assembly 104 into the "pour" position (as shown in FIG. 7), as contrasted with the "standby" position (as shown in FIG. 1). Once the batter spreader positioning motor 210 has driven the batter spreading assembly 104 into "pour" position, it stops, and the batter spreading assembly 104 (including, most visibly in this figure, the gear 234, described further hereinbelow) remains in this position throughout the remainder of the pour cycle.

The batter spreader motor 220, which is fixedly attached to the batter spreader positioning arm 230, is also apparent. Also, one of the larger, and more important, gears in the assembly 104, namely batter spreader positioning arm gear 234, is also apparent.

Notice that, at this stage, the beginning of the pour cycle, injera batter 160 has begun exiting the batter pour nozzle 168 under the encouragement of the batter metering pump 164. Once the batter 160 starts to pour, the batter spreader motor 220 is engaged.

Figure 8:
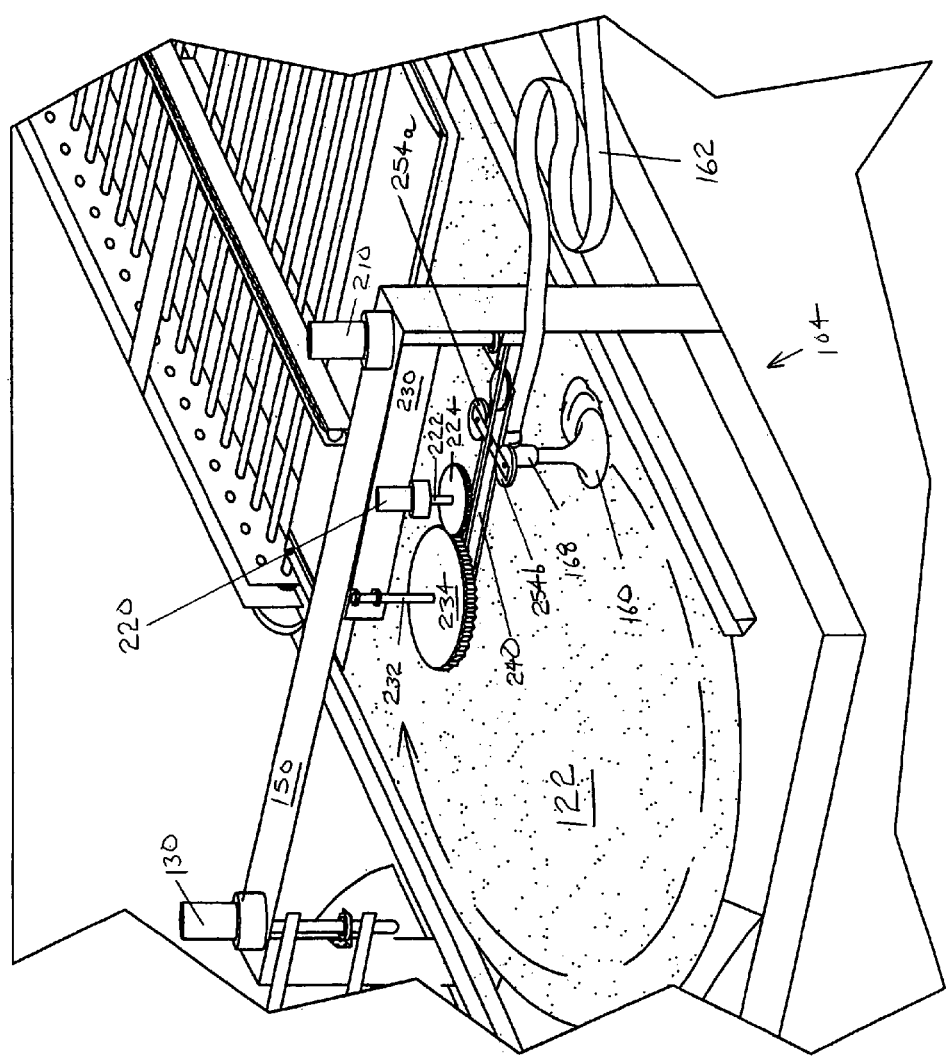
FIG. 8 presents a close-up perspective view of the invention at the start of the pour cycle.

Turning, now, to FIG. 8, a close-up perspective view of the invention 100, at the same point in time, the start of the pour cycle, is shown. This magnified view makes some of the components of the batter spreading assembly 104 more apparent.

The batter spreader motor 220, which is fixedly attached to the now-stationary batter spreader positioning arm 230, is again apparent. Attached to the batter spreader motor 220 is of course the batter spreader motor shaft 222 and attached to it, in turn, is the batter spreader motor gear 224.

The batter spreader motor gear 224 engages the batter spreader positioning arm gear 234, which is supported from the batter spreader positioning arm 230 by the batter spreader positioning arm shaft 232.

When batter spreader motor 220 drives the rotation of batter spreader positioning arm gear 234, batter spreader carrier arm 240 swings about. In so doing, it carries (directly or indirectly) a number of other components, such as the traveler wheels 254a, 254b and the batter pour nozzle 168, along a generally circular path over the cooking surface 122.

Figure 9:
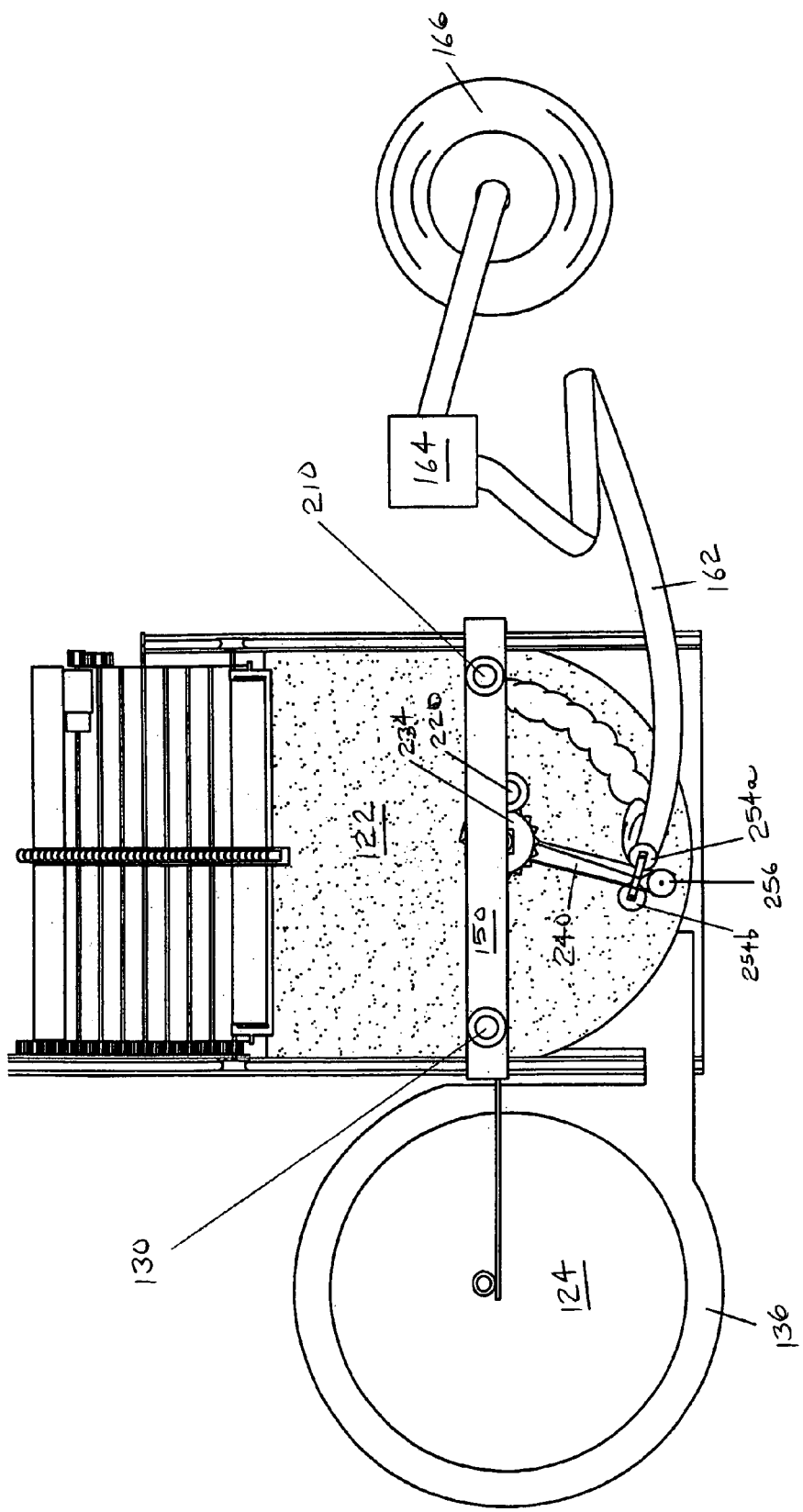
FIG. 9 presents a top view of the invention showing the pour cycle well under way.

Turning, now, to FIG. 9, a sectional top view of the invention 100, showing the pour cycle well under way, is shown.

Notice that, as stated above, when the batter spreader motor 220 drives the rotation of batter spreader positioning arm gear 234, batter spreader carrier arm 240 swings about. As it does so, traveler wheels 254a, 254b, and pulley 256, are carried along a generally circular path. Directly under traveler wheels 254a, 254b is batter pour nozzle 168, and it likewise is carried along a generally circular path, as evidenced by the circular trail of injera batter 160 shown in the figure.

Figure 10:
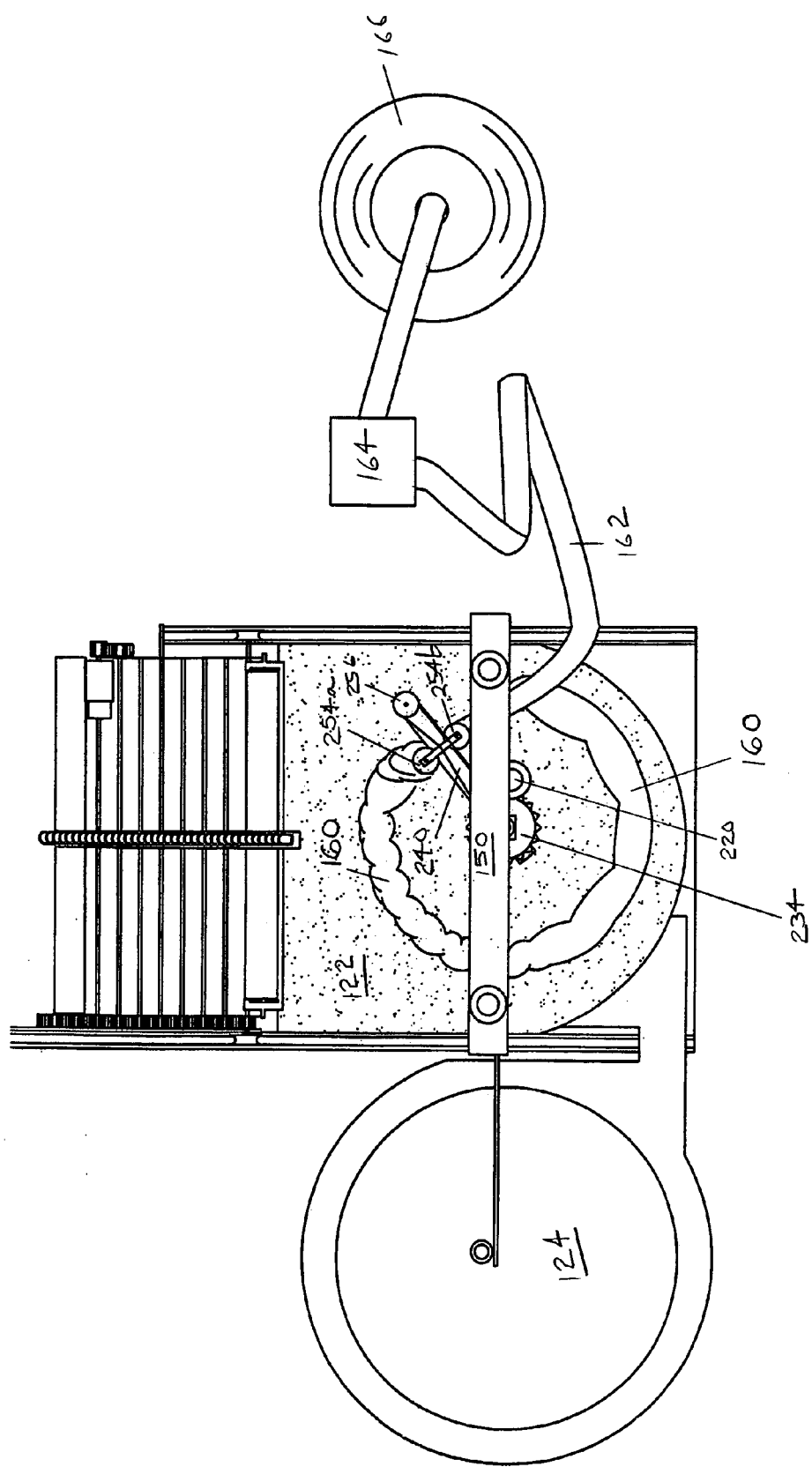
FIG. 10 presents a top view of the invention showing the further continuation of the pour cycle.

Turning, now, to FIG. 10, a sectional top view of the invention, showing the further continuation of the pour cycle, is shown.

This figure merits scrutiny for one main reason. Notice that the radius of the generally circular path of the injera batter 160 has begun to shrink so that, as rotation of the batter spreader carrier arm 240 continues, the batter 160 follows an inwardly spiraling path, rather than a continuous circular path. This ensures that an even pour of injera batter 160, uniformly covering an entire circular surface area on cooking surface 122, will be the ultimate result of this cycle of the process.

Clearly, a mechanism must exist (to be described shortly) which moves the traveler wheels 254a, 254b, and the batter pour nozzle 168 inward along the rotating batter spreader carrier arm 240 as the latter rotates about batter spreader positioning arm shaft 232.

The viscosity and surface tension of the injera batter 160 causes the batter 160 to flow together and form a generally even edge around the outer perimeter of the batter 160.

Figure 11:
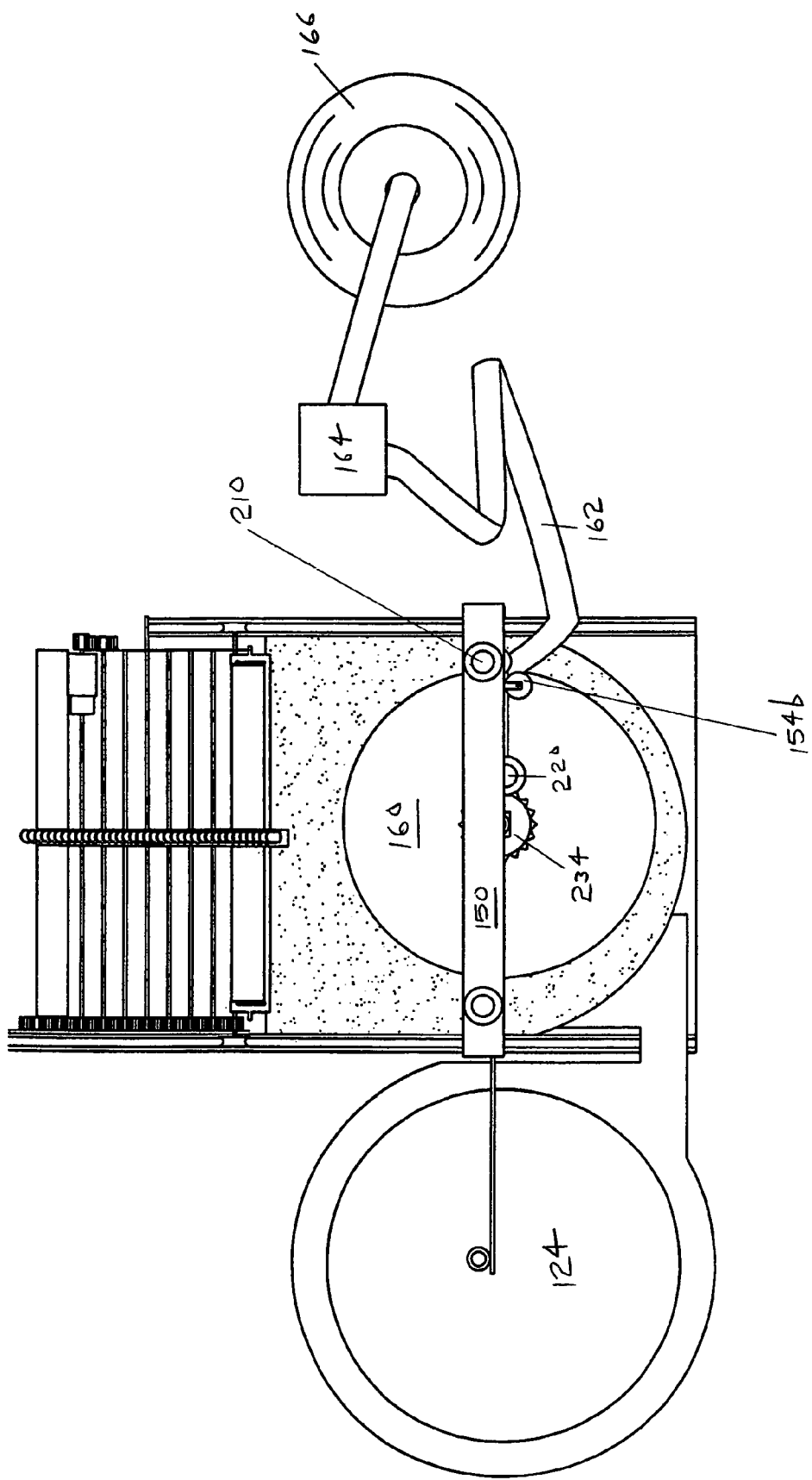
FIG. 11 presents a top view of the invention at the completion of the pour cycle.

Turning, now, to FIG. 11, a sectional top view of the invention, at the completion of the pour cycle, is shown. Notice that repeated rotations of the batter spreader carrier arm 240 has resulted in a thin pancake of batter 160 on cooking surface 122.

Notice, as well, that, after an appropriate amount of batter 160 was applied, batter flow was terminated (by means of batter metering pump 164) and batter spreader motor 220 was allowed to reverse course, driving the reverse rotation of batter spreader carrier arm 240 and, ultimately, the extension and return of traveler wheels 254a, 254b and the batter pour nozzle 168 to their fully outwardly extended initial positions.

Figure 12:
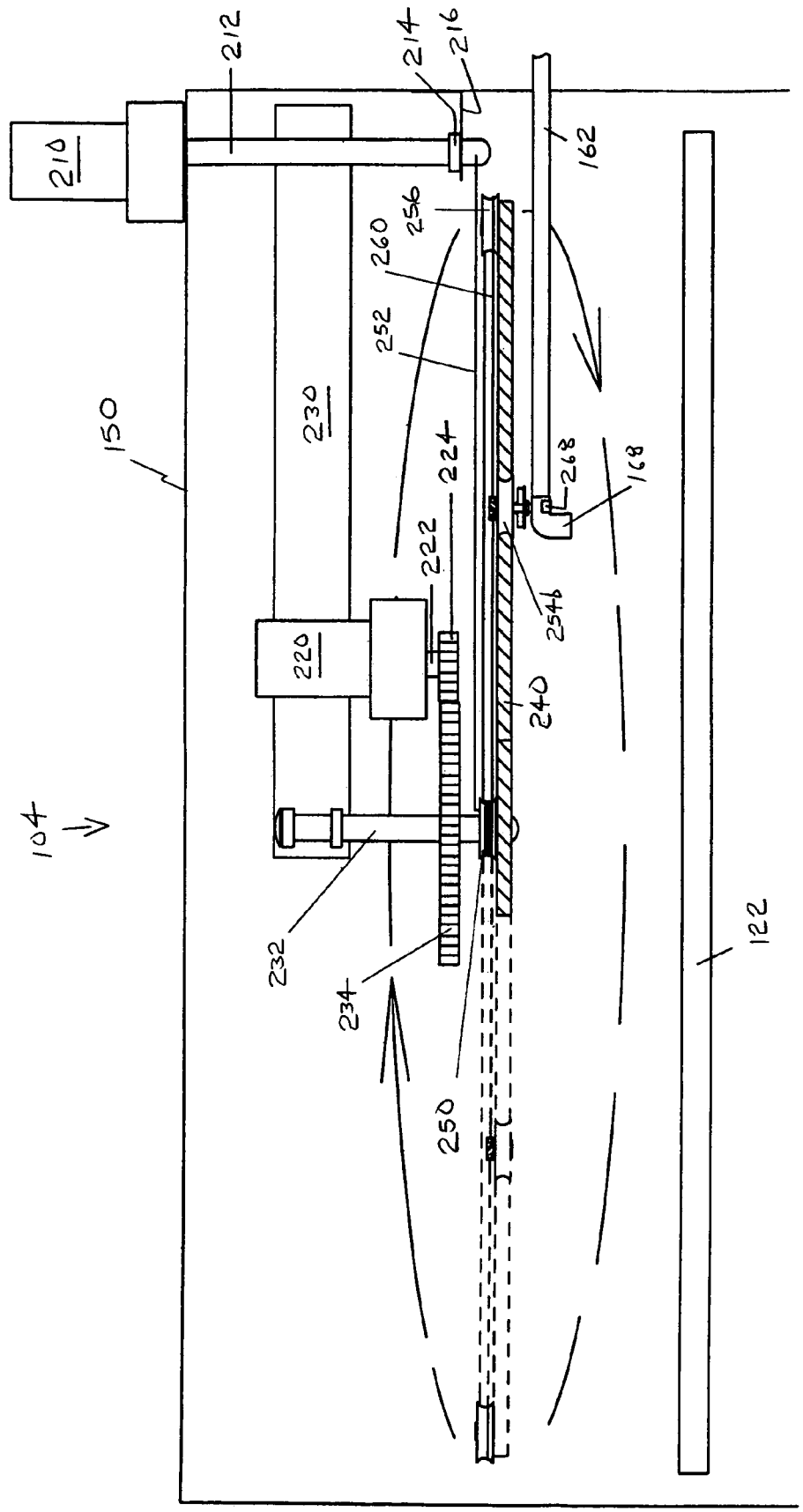
FIG. 12 presents a front view of the batter spreading assembly.

Turning, now, to FIG. 12, a front view of the batter spreading assembly 104 is shown.

As stated previously, batter spreader positioning motor 210 is fixedly mounted to the pad/spreader mounting frame 150. The batter spreader positioning motor 210 drives batter spreader positioning motor shaft 212, a shaft which is supported by batter spreader positioning motor shaft brace 216, a brace which is equipped with a batter spreader positioning motor shaft bearing 214 to receive the batter spreader positioning motor shaft 212 and allow it to turn freely whenever the batter spreader positioning motor 210 is engaged.

Immediately prior to the commencement of batter pour, as described hereinabove, the batter spreader positioning motor 210 rotates batter spreader positioning motor shaft 212 which, in turn, rotates batter spreader positioning arm 230 into "pour" position, a position in which it will remain throughout the remainder of Cycle Two.

It is at this juncture, with the batter spreader positioning motor 210 in a dormant state, that, as batter pour commences, the batter spreader motor 220 springs to life. The batter spreader motor 220, through its rotation of the batter spreader motor shaft 222 and batter spreader motor gear 224, drives the rotation of the batter spreader positioning arm gear 234.

The rotation of batter spreader positioning arm gear 234 yields an important result: the rotation of batter spreader carrier arm 240. However, even as carrier arm 240 rotates, a closely proximate component, the spooler 250, remains stationary. Spooler 250 (also known as the "stationary spooler" 250) remains stationary due to the locking effect of spooler brace 252 (which is attached to the batter spreader positioning motor shaft 212).

A careful inspection of FIG. 12 reveals that, clearly, the carrier arm 240 has completed at least one rotation, because the traveler wheel 254b (linked to the batter pour nozzle 168) has traveled nearly half the length of the carrier arm 240. The mechanism driving the inward travel of the traveler wheels 254a, 254b is an elegant one; it is the string 260 which wraps around stationary spooler 250 as the carrier arm 240 effects its rotations.

Figure 13:
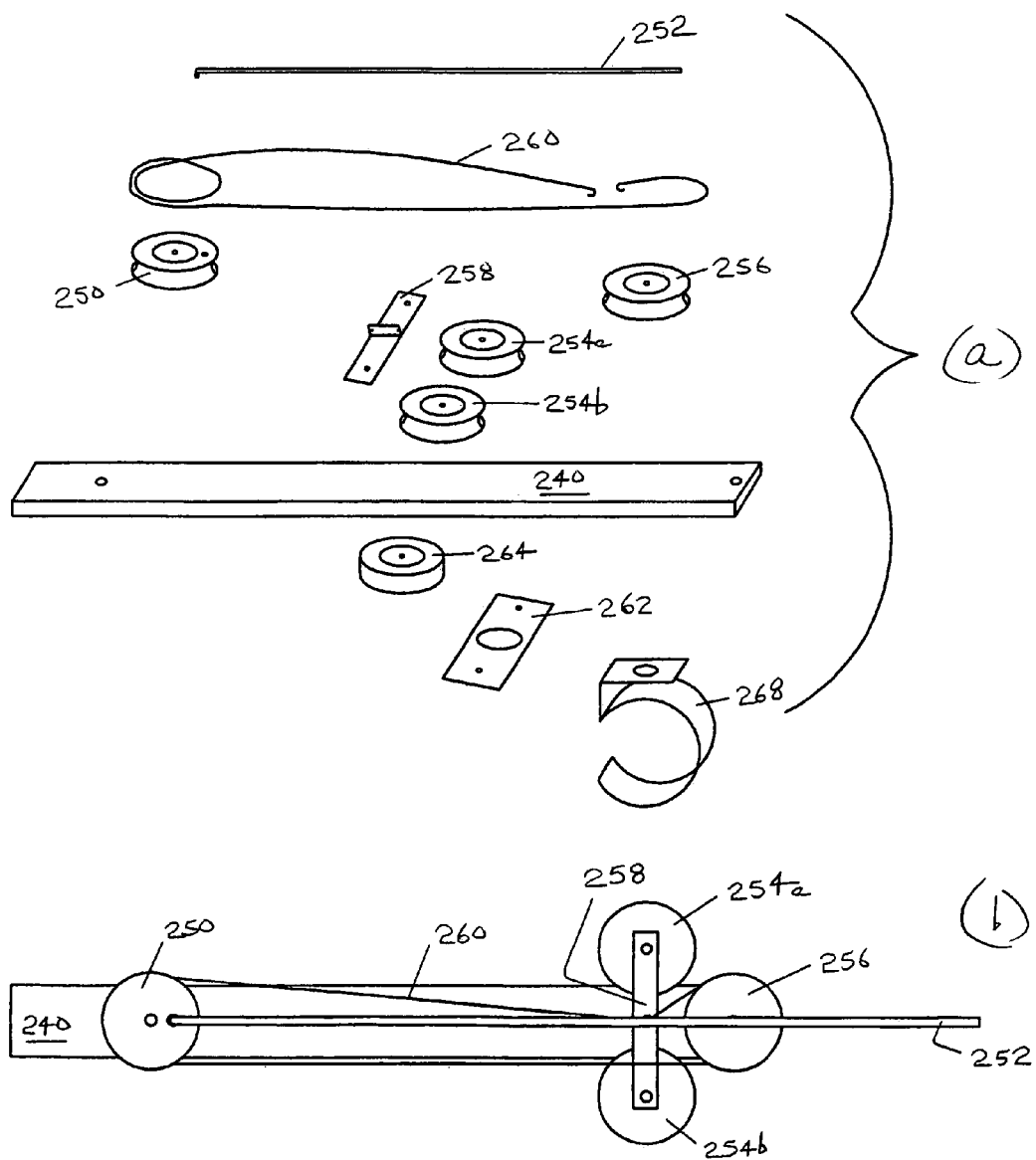
FIG. 13 presents various aspects of the batter spreading assembly

Turning, now, to FIG. 13, various aspects of the batter spreading assembly 104 are shown.

In section (a) of FIG. 13, a disassembled view of the assembly 104 is shown. Notice, in particular, the interrelationship between the string 260 and the stationary spooler 250, the upper bracket 258, and the pulley 256. As carrier arm 240 is rotated in a clockwise direction (viewed from above), one end of the string 260 pulls on the upper bracket 258, translating the traveler wheels 254a, 254b inwards towards the center of the cooking surface 122. Similarly, after clockwise rotation has occurred so as to deposit a sufficient supply of batter 160 (as described above), then counter-clockwise rotation can commence, returning the upper bracket 258 (by the action of the opposite end of string 260), and traveler wheels 254a, 254b, towards the outermost position on carrier arm 240.

Section (b) of FIG. 13 shows these components in an assembled position and thus makes their interoperation clear. In particular, notice the effect of spooler brace 252, locking as it does stationary spooler 250 by means of its engagement with the periphery of that component. The path of the string 260, and its mode of engagement about stationary spooler 250 and pulley 256, is clearly depicted as well (notice, as well, that rotation has clearly just begun, because the traveler wheels 254a, 254b are closely proximate to the pulley 256).

Figure 14:
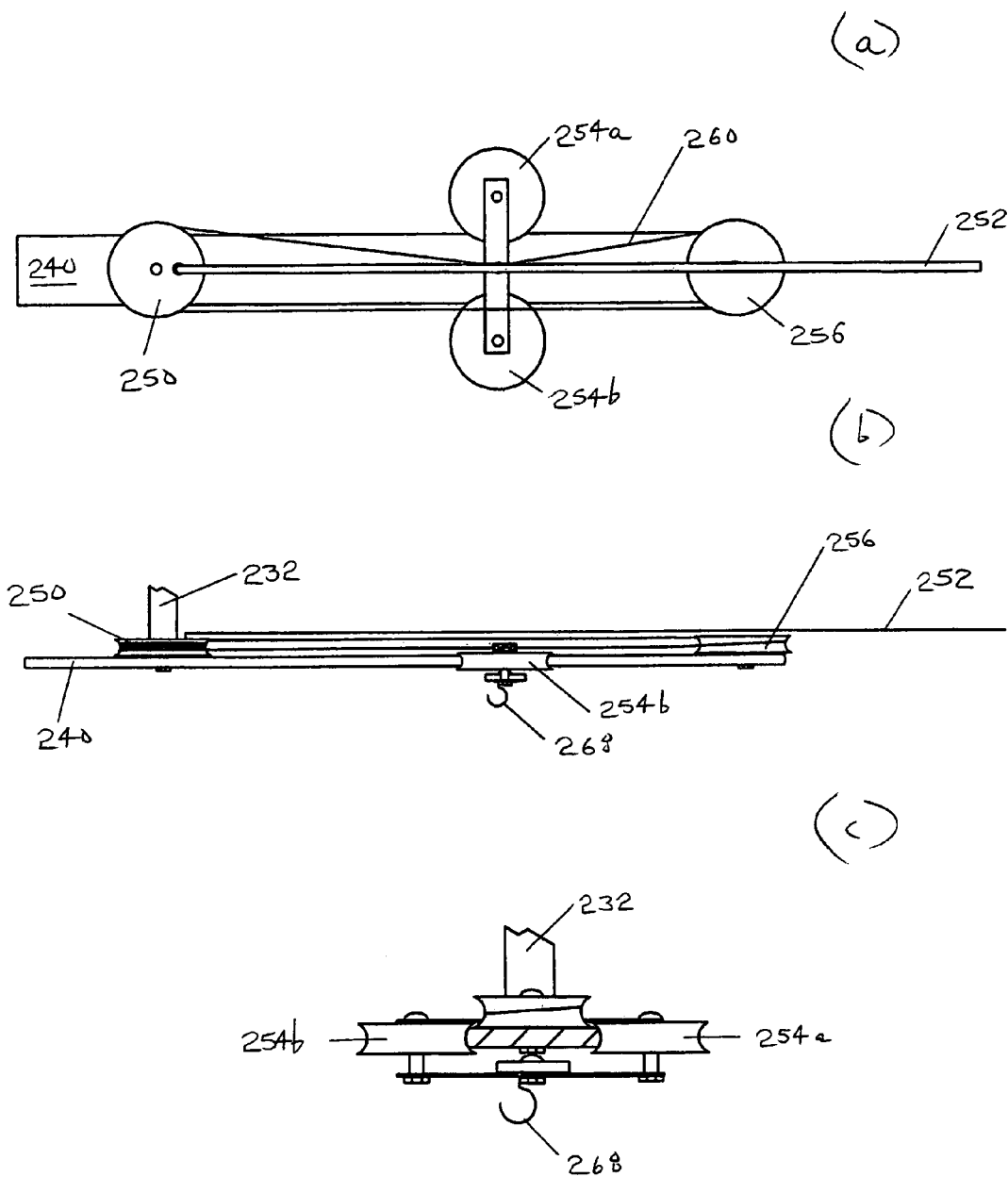
FIG. 14 presents various aspects of the batter spreading assembly.

Turning, now, to FIG. 14, various aspects of the batter spreading assembly 104 are shown.

Section (a) of FIG. 14 again shows the components of the batter spreading assembly 104 in an assembled position and thus clarifies their operation. In particular, notice rotation has commenced for a short time, as the traveler wheels 254a, 254b are located some distance from the pulley 256 (again highlighting the path of the string 260 and its mode of engagement about stationary spooler 250 and pulley 256).

In section (b) of FIG. 14, a side view of the batter spreading assembly 104 is shown, this view clarifying the linked and fixed proximate relationship between the traveler wheel 254b and the batter pour nozzle holder 268.

In section (c) of FIG. 14, a front view of the batter spreading assembly 104 is shown. Once again, this view serves primarily to depict the linked and fixed proximate relationship between the traveler wheels 254a, 254b and the batter pour nozzle holder 268.

Figure 15:
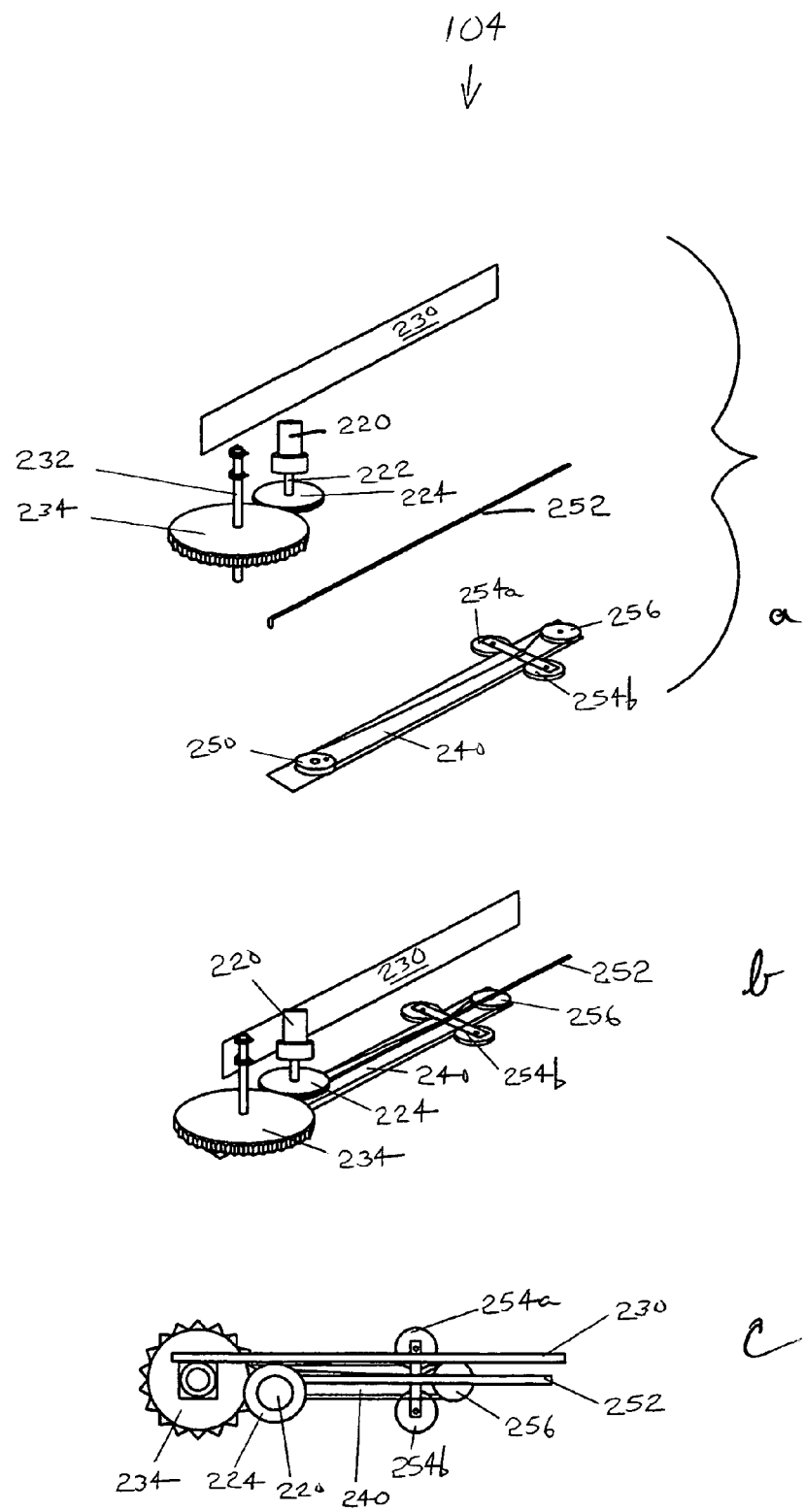
FIG. 15 presents various perspective views of the batter spreading assembly.

Turning, now, to FIG. 15, various perspective views of the batter spreading assembly 104 are shown.

In section (a) of FIG. 15, a disassembled view of the assembly 104 is shown. This view emphasizes the elevational position of important components. Specifically, notice that the batter spreader positioning arm 230 and its related components is placed in a position above the batter spreader carrier arm 240 and its related components. The spooler brace 252 is also shown to connect to the stationary spooler 250 (which it secures) but not to the pulley 256.

Section (b) of FIG. 15 provides a perspective view of assembly 104 in an assembled condition.

Section (c) of FIG. 15 provides a top view of assembly 104. Specifically, it clarifies the relative dimensions of the batter spreading positioning arm 230 vis-à-vis the spooler brace 252, as well as the relative dimensions of the batter spreader motor gear 224 vis-à-vis the spreader positioning arm gear 234.

Cycle Three: Injera Baking.

Figure 16:
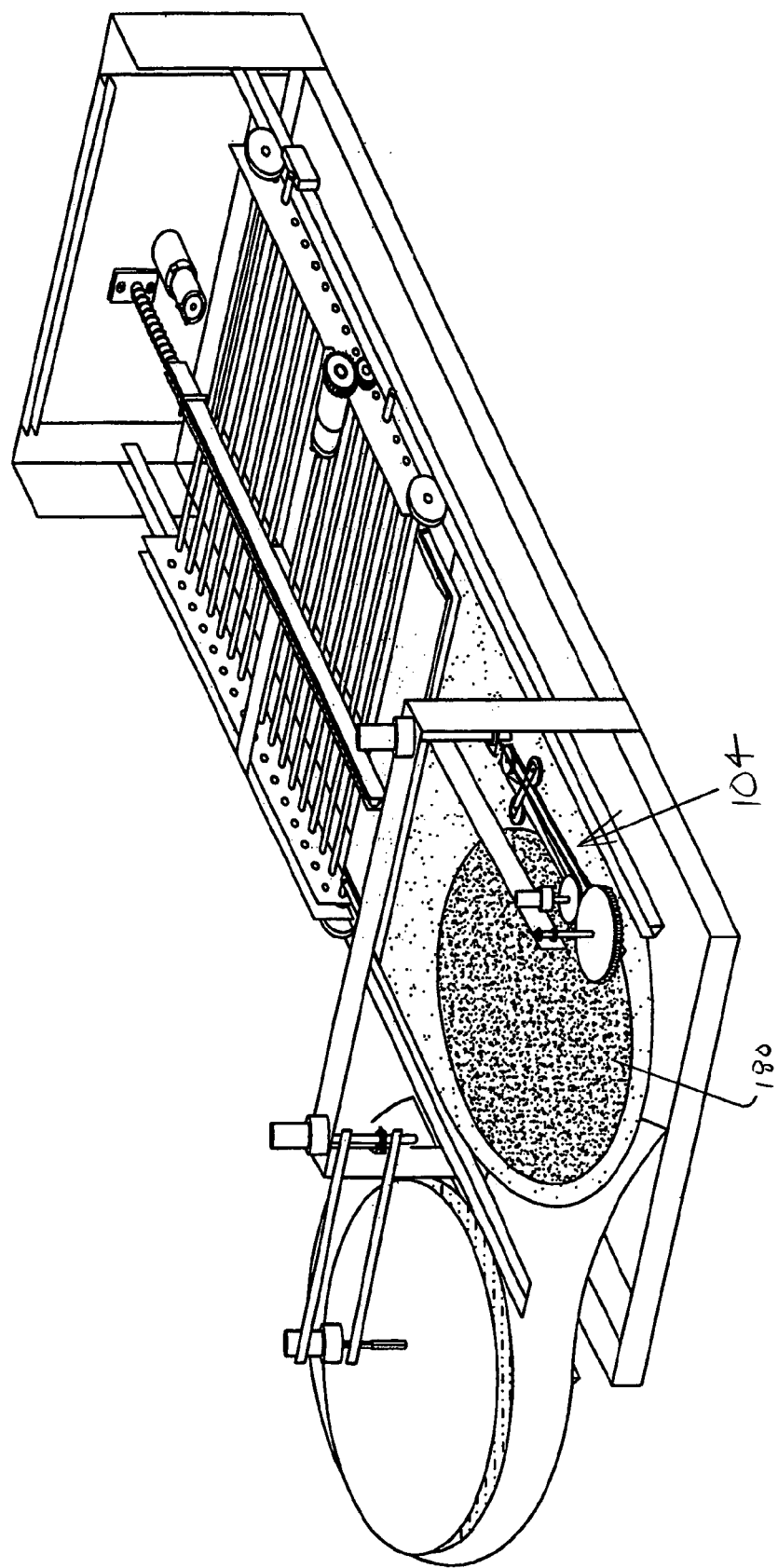
FIG. 16 presents the invention as it appears during the stage associated with the baking cycle.

Turning, now, to FIG. 16, the invention 100, as it appears during the stage associated with Cycle Three, the injera baking cycle (or, simply, the "baking cycle"), is shown.

Notice that, after the pour cycle was completed, the batter spreader positioning motor 210 swiveled the batter spreading assembly 104 back into the "standby" position (as originally shown in FIG. 1). Once the batter spreader positioning motor 210 has driven the batter spreading assembly 104 into "standby" position, it stops, and the batter spreading assembly 104 (including, most visibly, the batter spreader positioning arm gear 234) remains in this position throughout the remainder of the baking cycle.

Baking of the injera batter 160 continues until an injera wafer 180 results. The precise cook time will vary depending upon several factors including the composition of the injera batter 160, the temperature of the cooking surface 122, and even the altitude of the locale at which food preparation occurs.

A variety of process control regimens can be employed, manifesting various cost-benefit tradeoffs to the astute designer, to manage the injera production process. At each stage of the process described herein, key process states (including, frequently, the physical positioning of various assembly components) are described and can be used in conjunction with various electro-mechanical subassemblies, relays, limit switches and process controllers to step the machine described herein through its paces.

With regard to the baking step, some designers will find it simplest to bake the injera wafer 180 for a set period of time, as controlled by a timer. Others will bake until one or more measurable physical parameters of the injera wafer 180 suggest that cooking is complete. For example, the baking time may be humidity sensed. Humidity sensed baking is effectuated by monitoring the change in humidity near the baking surface. When injera batter 160 is first poured onto the hot baking surface 122, there is a rapid increase in humidity due to the high water content of the batter 160. Shortly thereafter, however, the humidity drops as the injera 180 nears the end of the bake cycle.

Cycle Four: Injera Collection/Deposition.

Figure 17:
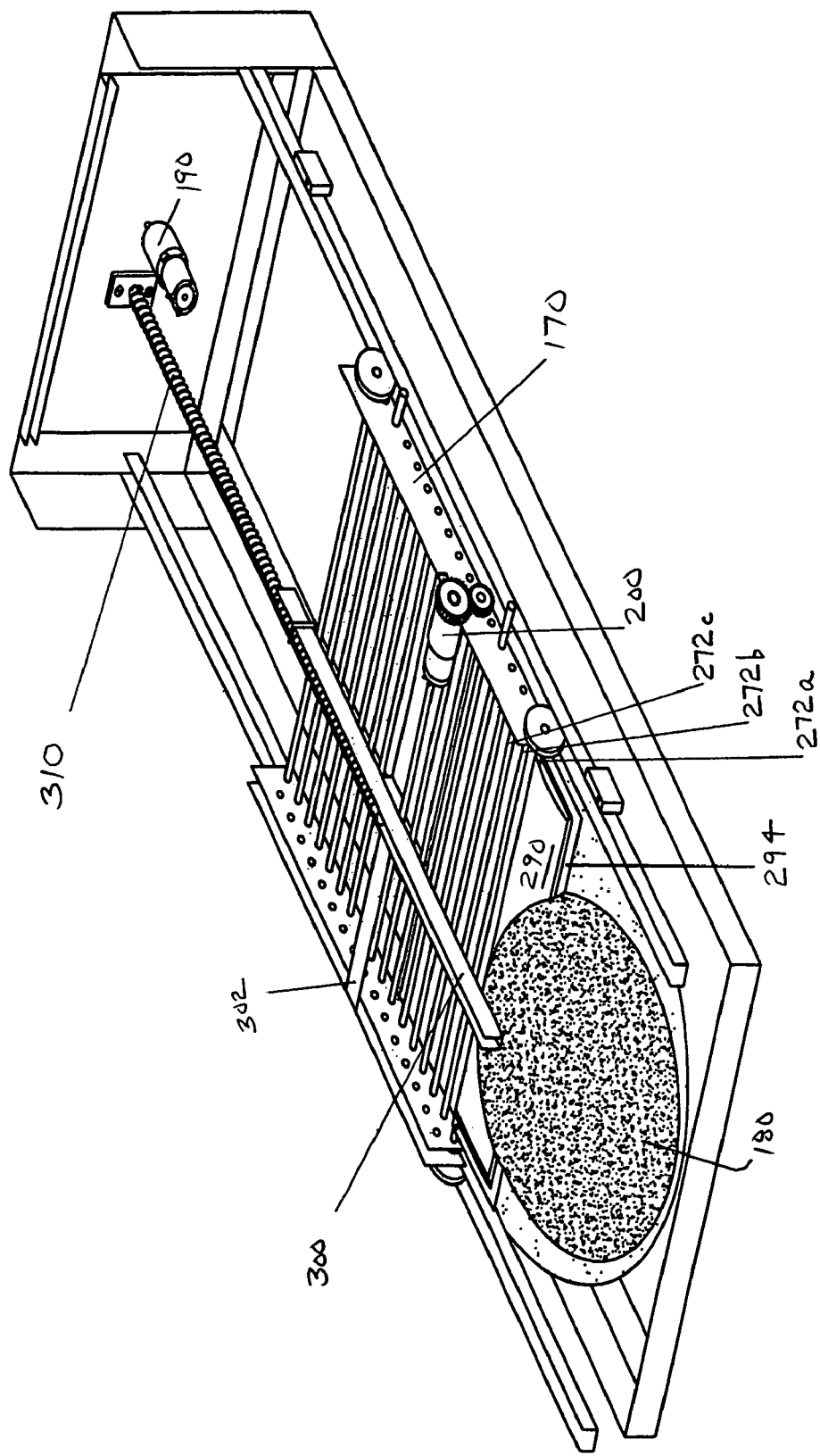
FIG. 17 presents the invention as it appears during the commencement of injera collection.
Figure 18:
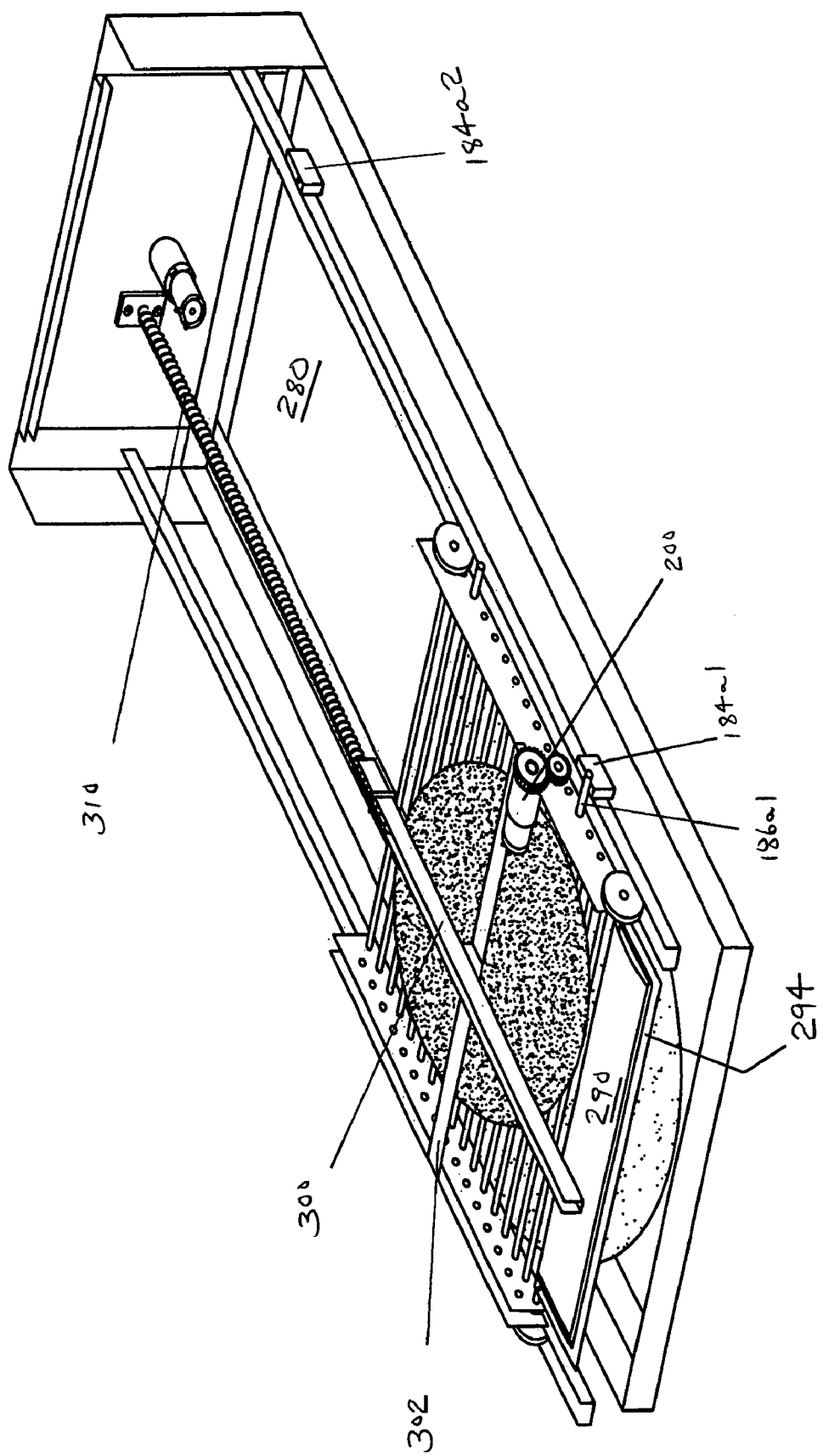
FIG. 18 presents the invention well into injera collection with the baked injera resting entirely on the conveyor.

Turning to FIG. 17 and FIG. 18, the invention 100, as it appears during the stages associated with Cycle Four, the injera collection/deposition cycle (or, alternatively, the "conveyor cycle"), is shown.

When the injera batter 160 is poured on to the baking surface 122, the viscosity and surface tension of the batter 160 will cause the thickness of the batter pour 160 to be thinner at the outer perimeter of the pour than it is towards the center. This phenomenon causes the outer edge of the injera 180 to bake slightly dry and to curl up and lift off the baking surface 122 somewhat. This natural occurrence makes it easier for the leading spatula edge 294 of the conveyor 170 to get under the injera wafer 180 during injera collection/removal from the baking surface 122.

Thus, when the baking cycle (i.e., Cycle Three) is done, and it is time to remove the injera 180 from the baking surface 122, the conveyor push/pull drive motor 190 and the conveyor roller drive motor 200 start to run.

As shown in FIG. 17, the forward progress of the conveyor 170 will eventually lead the spatula 294 to engage the upraised edge of the injera wafer 180, lifting and guiding it onto the rearwardly rotating pickup belt 290. The pickup belt 290, in turn, facilitates the lifting and scooping of the injera wafer 180 onto a plurality of conveyer rollers 272 which comprise the upper effective supporting surface of the conveyor 170.

A note about the conveyor rollers 272 is in order. The forwardmost conveyor roller, designated herein as conveyor roller 272a, resides within the rearmost portion of pickup belt 290. Rearward rotation by this roller induces a rearward rotation of pickup belt 290 which facilitates the transfer of the injera wafer 180 onto the remaining conveyor rollers which are designated 272b, 272c, 272d, etc. as one progresses in a rearward direction along the conveyor 170.

It will be recalled that both the conveyor push/pull drive motor 190 and the conveyor roller drive motor 200 are running at this time. The former motor 190 is what drives the conveyor 170 forward. The latter motor 200 imparts a rearward rotation to the conveyor rollers 272. This rearward rotation of the conveyor rollers 272 greatly facilitates the manipulation of the injera wafer 180 from the spatula 294 onto the pickup belt 290 and, finally, entirely onto the plurality of rollers 272 that comprise the upper effective supporting surface of the conveyor 170.

Turning, now, to FIG. 18, it will be observed that the two motors 190, 200 continue to run until the conveyor 170 is fully extended over the baking surface 122. At this point, the baked injera wafer 180 rests in its entirety on the plurality of conveyer rollers 272 which represent the upper effective supporting surface of the conveyor 170.

From a process control standpoint, the forward progress of the conveyor is halted by the controller when limit switch trigger 186a1 approaches limit switch 184a1 (although the conveyor may be configured to stop at its functional extremity by any convenient and effective means).

The activation of the limit switch signals (such as the activation of limit switch 184a1 by the proximity of limit switch trigger 186a1) is the sign to the controller to stop both the conveyor push/pull drive motor 190 and the conveyor roller drive motor 200.

After both motors 190, 200 are stopped, the controller instructs the conveyor push/pull drive motor 190 to operate in the reverse direction, pulling the conveyor 170 away from the baking surface 122 with the baked injera 180 resting on top of the now-stationary conveyor rollers 272.

It is important to note that the conveyor roller drive motor 200 remains off while the conveyor push/pull drive motor 190 runs in reverse. In this way, the baked injera 180 will remain on top of the conveyor 170 until it is time to collect/remove the next baked injera wafer 182.

Cycle Five: Injera Cooling.

Figure 19:
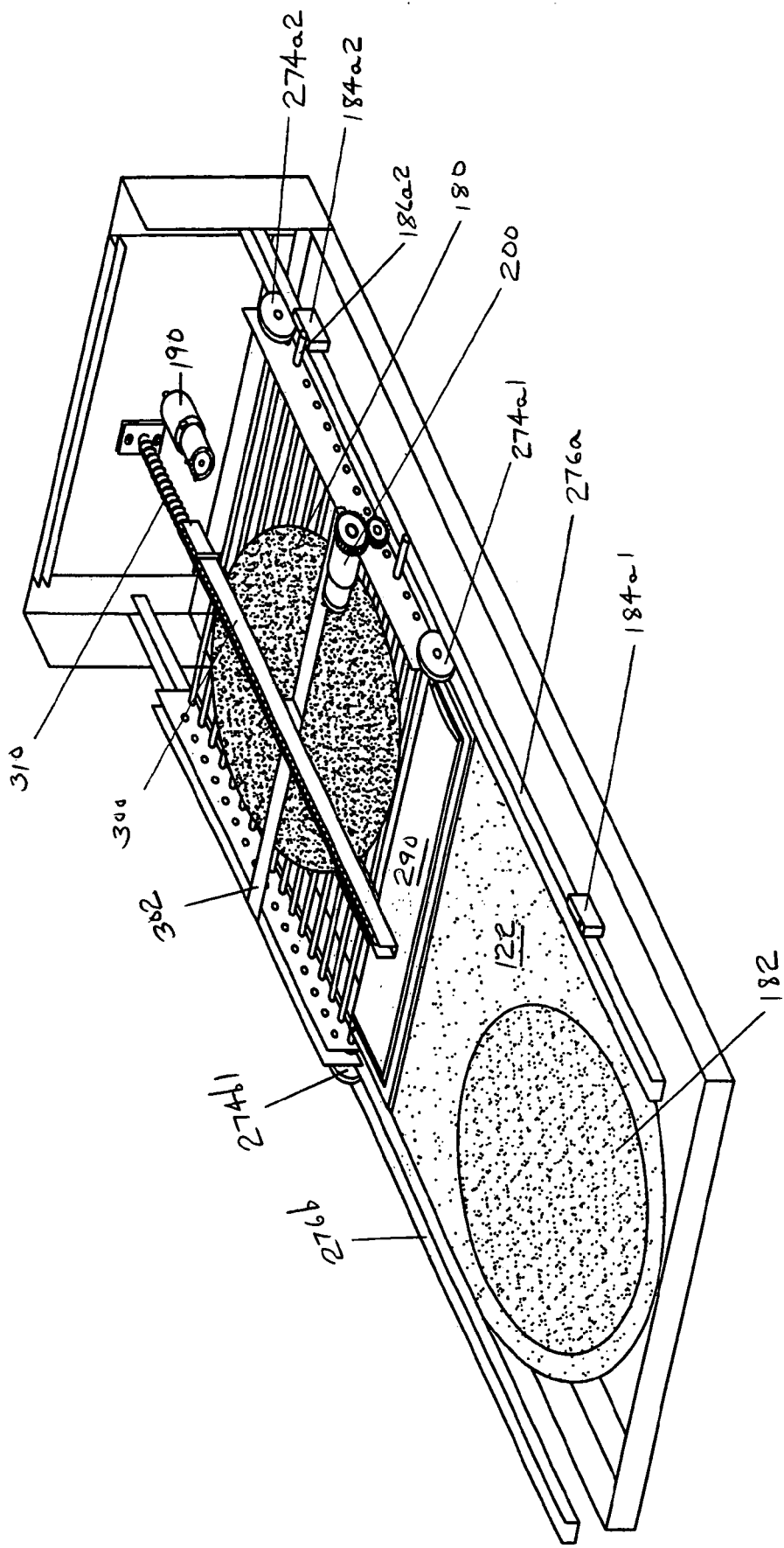
FIG. 19 presents the invention as it appears during the stage associated with cooling; in addition, it depicts the preparation of a second injera wafer.

Turning to FIG. 19, the invention 100, as it appears during the stage associated with Cycle Five, the injera cooling cycle, is shown.

In this figure, the conveyor 170 has been retracted to its fully withdrawn and rearward position. During the time the conveyor 170 is translating rearward, and during the time the injera wafer 180 rests upon the conveyor 170 at its rearmost position, the injera wafer 180 cools, a useful step in the preparatory process.

From a process control standpoint, the rearward travel of the conveyor 170 is halted when full conveyor retraction is detected (as, for example, through the proximity of limit switch trigger 186a2 to limit switch 184a2).

The Repetitive Nature of the Inventive Process.

At this point in the overall cycle, the process controller re-initiates Cycle One (the cooking surface polish cycle) so as to cleanse the baking surface 122 in anticipation of Cycle Two (batter application) and Cycle Three (injera baking).

Returning to FIG. 19, it will be noted that, not only has the injera wafer 180 cooled, but, in addition, this cooling has taken place while Cycle One, Cycle Two, and Cycle Three have transpired, resulting in a newly cooked injera wafer 182.

When Cycle Three (injera baking) is complete, this newly prepared injera wafer 182 will be ready to be collected in Cycle Four in the same manner as its predecessor injera wafer 180.

Cycle Four Revisited: A Closer Look at Injera Collection/ Deposition.

Turning to FIG. 20 through FIG. 29, the invention 100, as it appears during the stages associated with Cycle Four, the injera collection/deposition cycle (or, alternatively, the "conveyor cycle"), is shown. These figures yield a more complete picture of the ongoing cycle (effectuated with multiple injera wafers) as originally described and discussed in conjunction with FIG. 16 and FIG. 17 above (involving a single injera wafer).

Figure 20:
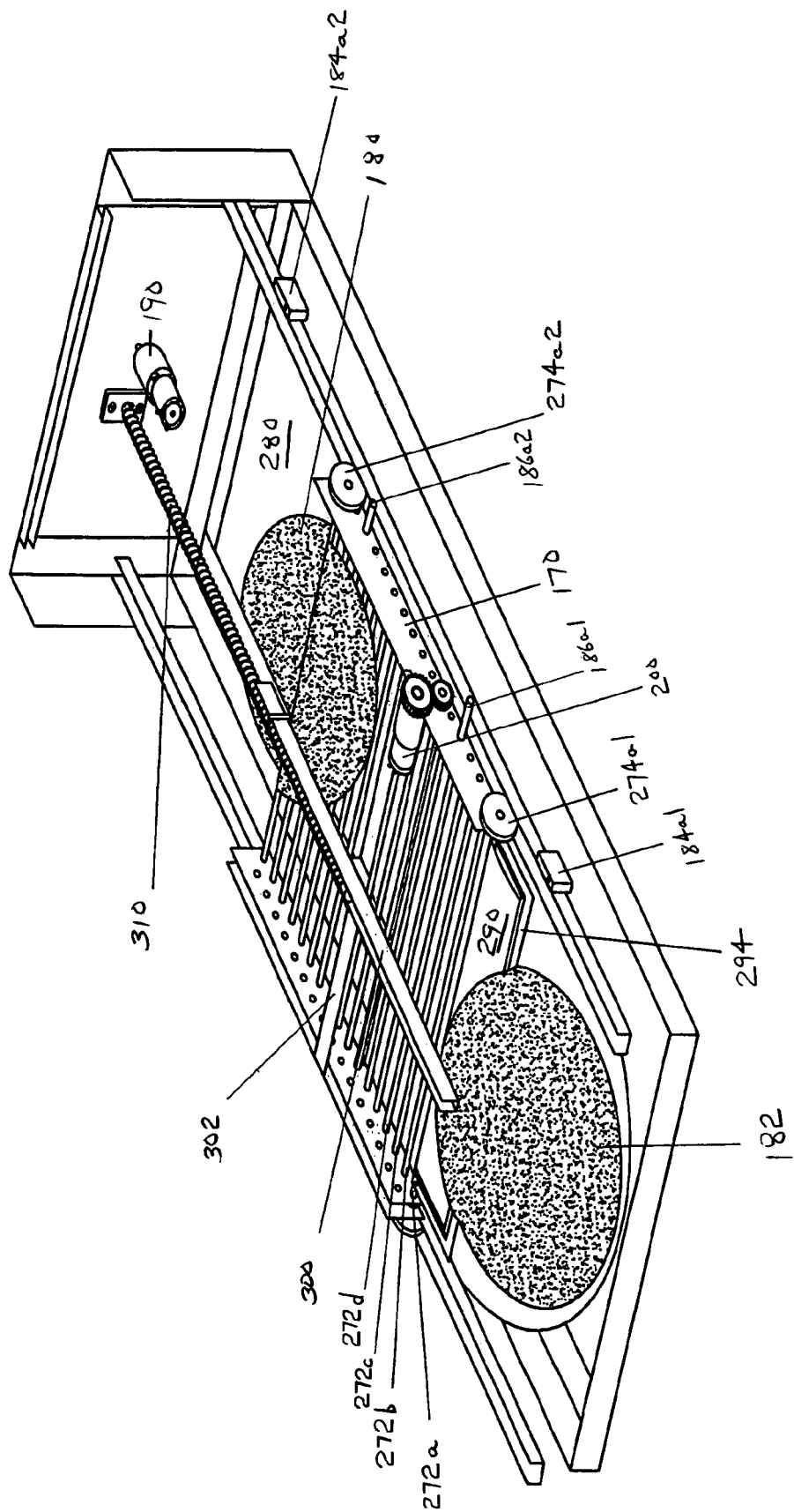
FIG. 20 presents the invention at the outset of injera collection/deposition.

Turning, now, to FIG. 20, the astute reader will recognize that, in precisely the same manner as described in conjunction with FIG. 17 at the outset of Cycle Four, when it was time to remove the injera 180 from the baking surface 122, the conveyor push/pull drive motor 190 and the conveyor roller drive motor 200 both start to run.

The forward progress of the conveyor 170 leads the spatula 294 to engage the upraised edge of the injera wafer 182, lifting and guiding it onto the rearwardly rotating pickup belt 290. The pickup belt 290, in turn, facilitates the lifting and scooping of the injera wafer 182 onto the conveyer rollers 272.

The unique dual purpose of the conveyor rollers 272 can now be appreciated. As described hereinabove, the rearward rotation of the conveyor rollers 272 greatly facilitates the manipulation of the injera wafer 180 from the spatula 294 onto the pickup belt 290 and, finally, entirely onto the rollers 272 that comprise the upper surface of the conveyor 170.

In addition, however, the conveyor rollers 272 serve another purpose. Their rearward rotation, while the conveyor 170 translates forward, facilitates the removal of the now cooled injera wafer 180 from the conveyor onto a lower stacking surface 280.

As described previously, the two motors 190, 200 continue to run until the conveyor 170 is fully forwardly extended over the baking surface 122. At this point, the baked injera wafer 182 will rest in its entirety on the conveyer rollers 272. In addition, at that point, the now cooled injera wafer 180 will now rest in its entirety on the stacking surface 280.

As before, the forward progress of the conveyor 170 is halted by the controller when limit switch trigger 186a1 approaches limit switch 184a1; the activation of the limit switch 184a1 signals the controller to stop both the conveyor push/pull drive motor 190 and the conveyor roller drive motor 200.

After both motors 190, 200 are stopped, the controller instructs the conveyor push/pull drive motor 190 to operate in the reverse direction, pulling the conveyor 170 away from the baking surface 122 with the baked injera 182 resting (and cooling) on top of the now-stationary conveyor rollers 272.

It bears repeating that the conveyor roller drive motor 200 remains off while the conveyor push/pull drive motor 190 runs in reverse. In this way, the baked injera 182 will remain on top of the conveyor 170 until it is time to collect/remove the next baked injera wafer.

Figure 21:
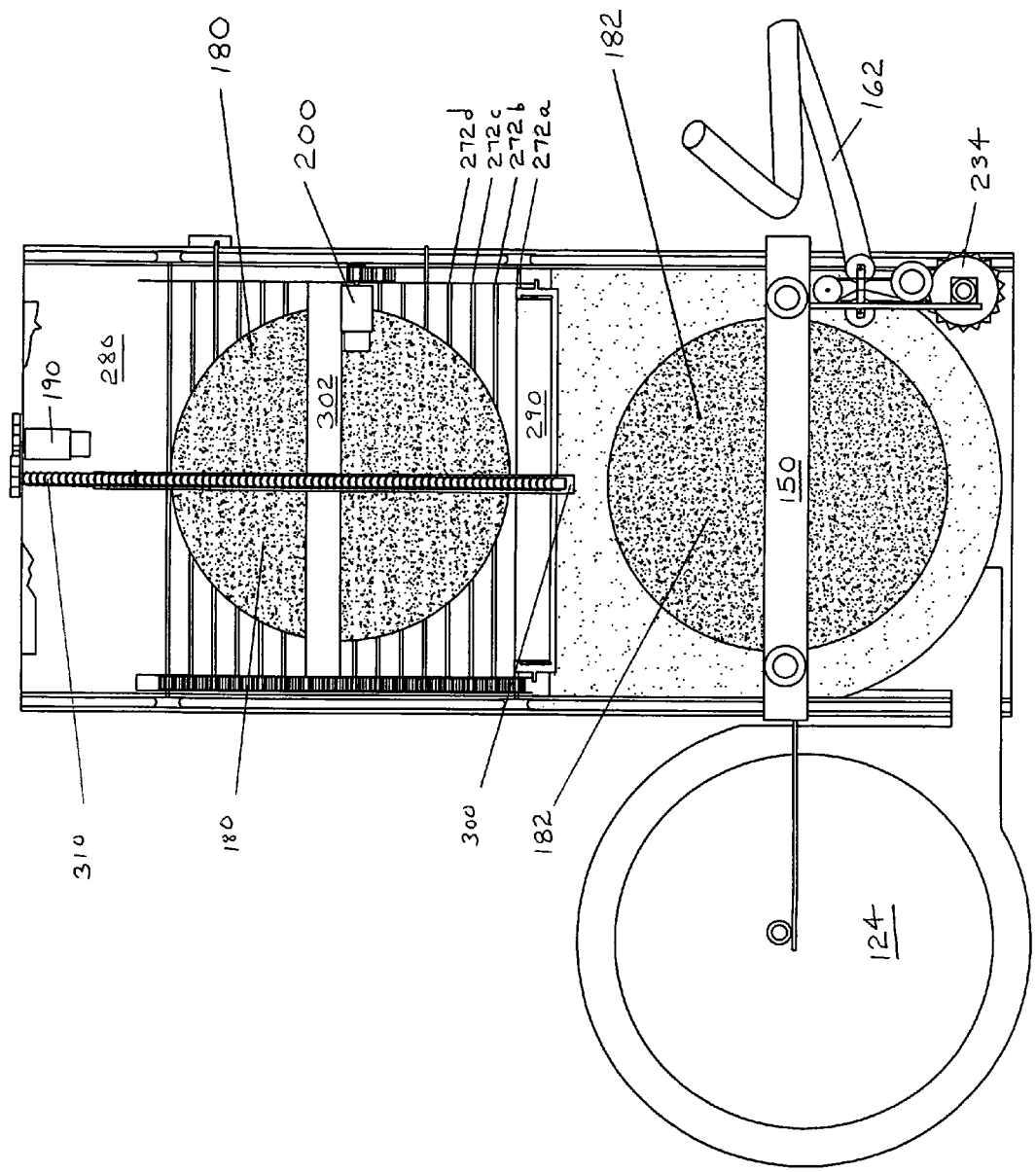
FIG. 21 presents a top view of the invention at the state depicted in FIG. 19.

Turning, now, to FIG. 21, a top view of the invention, depicting the location of the various invention components, and the two injera wafers 180, 182, is shown. The state of the process is precisely that shown in FIG. 19; only the vantage point (now from directly overhead) is different.

Figure 22:
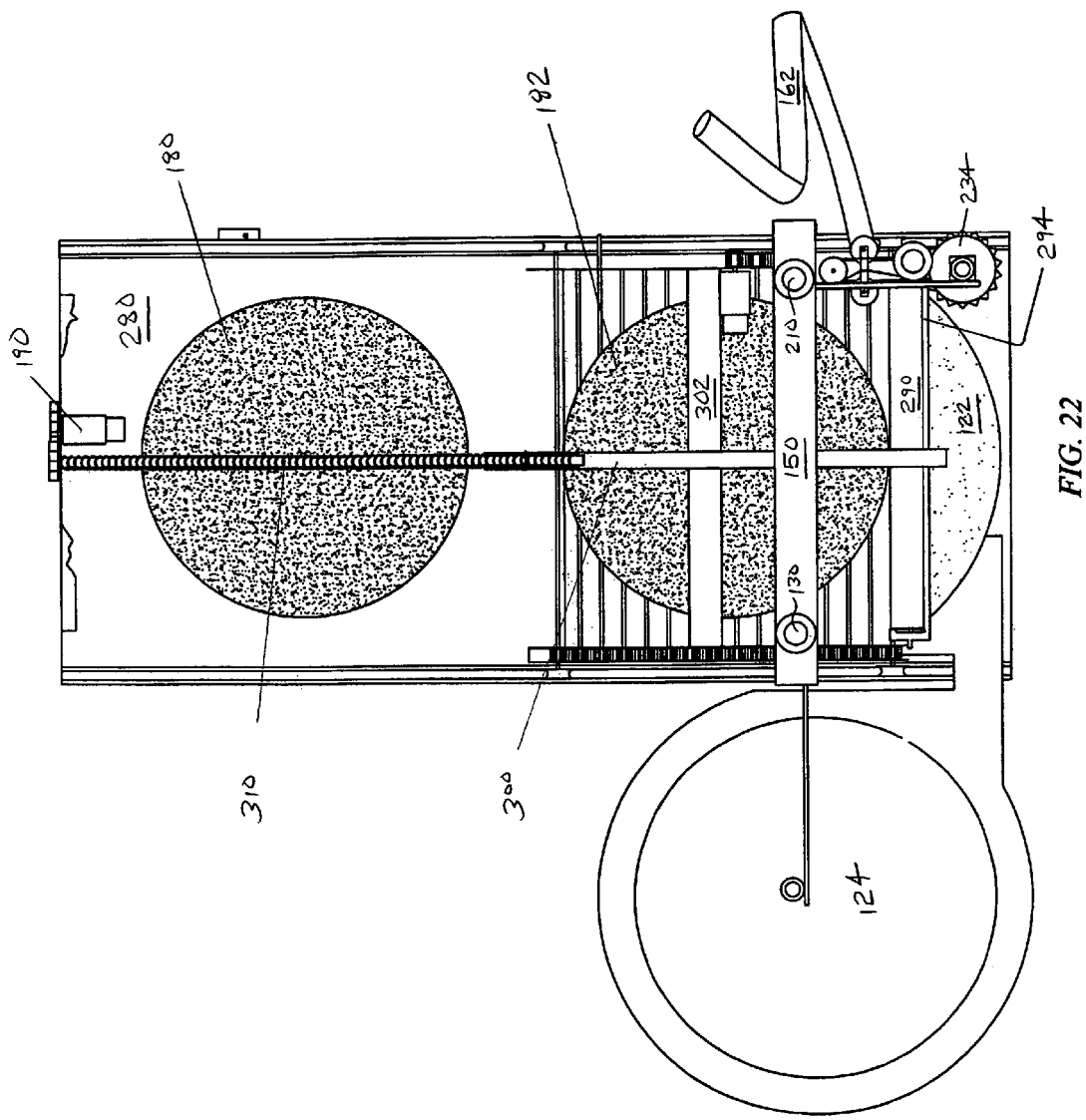
FIG. 22 presents a top view of the invention with two injera wafers in view.

Turning, now, to FIG. 22, another top view of the invention, now with the injera wafer 182 lifted from the baking surface 122 onto the conveyor rollers 272, and now also showing the preceding injera wafer 180 lying uppermost on a stack of injera wafers on stacking surface 280.

Figure 23:
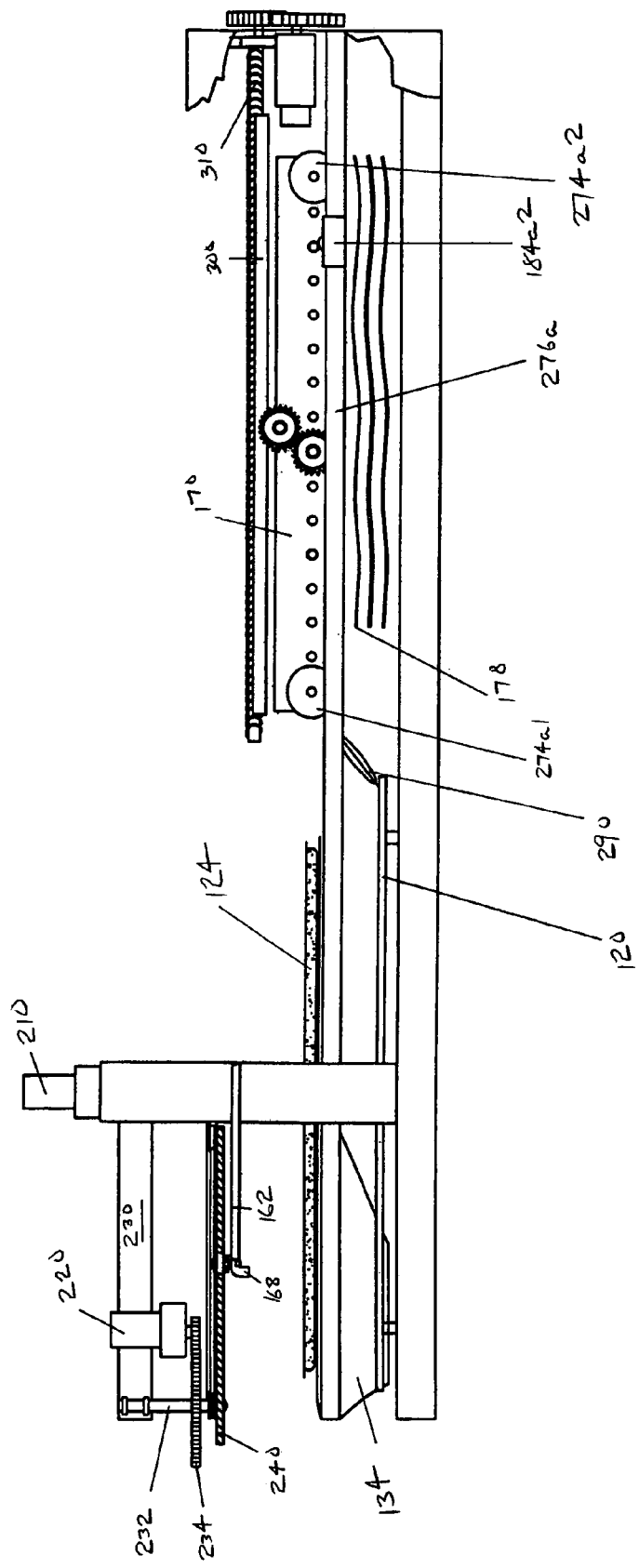
FIG. 23 presents a side view of the invention taken from the left side looking towards the center of the baking surface.

Turning, now, to FIG. 23, a side view of the invention, taken from the left side looking towards the center of the baking surface 122, is shown. This figure clarifies the relative height of several of the invention's components.

For example, the astute reader will observe the relative height of the conveyor 170 as compared to the pan 120 (as well as the polishing pad 124 when it is resting upon the polishing pad landing 136). The angled assembly comprising the spatula 294 and pickup belt 290 is also apparent, bridging as it does the conveyor assembly 108 and the pan 120.

In FIG. 23, one will also notice the stack of injera wafers (including an uppermost injera wafer 178) located at the rearmost portion of the invention. In a fully automated, high-volume, embodiment of the invention, the stacking surface 280 could be a surface which can be elevated or depressed in a controlled fashion, so that, when the first injera wafer is produced, cooled, and deposited on the stacking surface 280, the latter surface 280 descends ever so slightly so that the next wafer stacked after cooling will only fall a very short distance off the conveyor rollers 272. The stacking surface 280, in such a high-volume embodiment, would continue to descend until a fairly substantial stack of injera cakes was generated (perhaps then translating in a sideways or transverse direction so as to serve the injera stack to the user).

Figure 24:
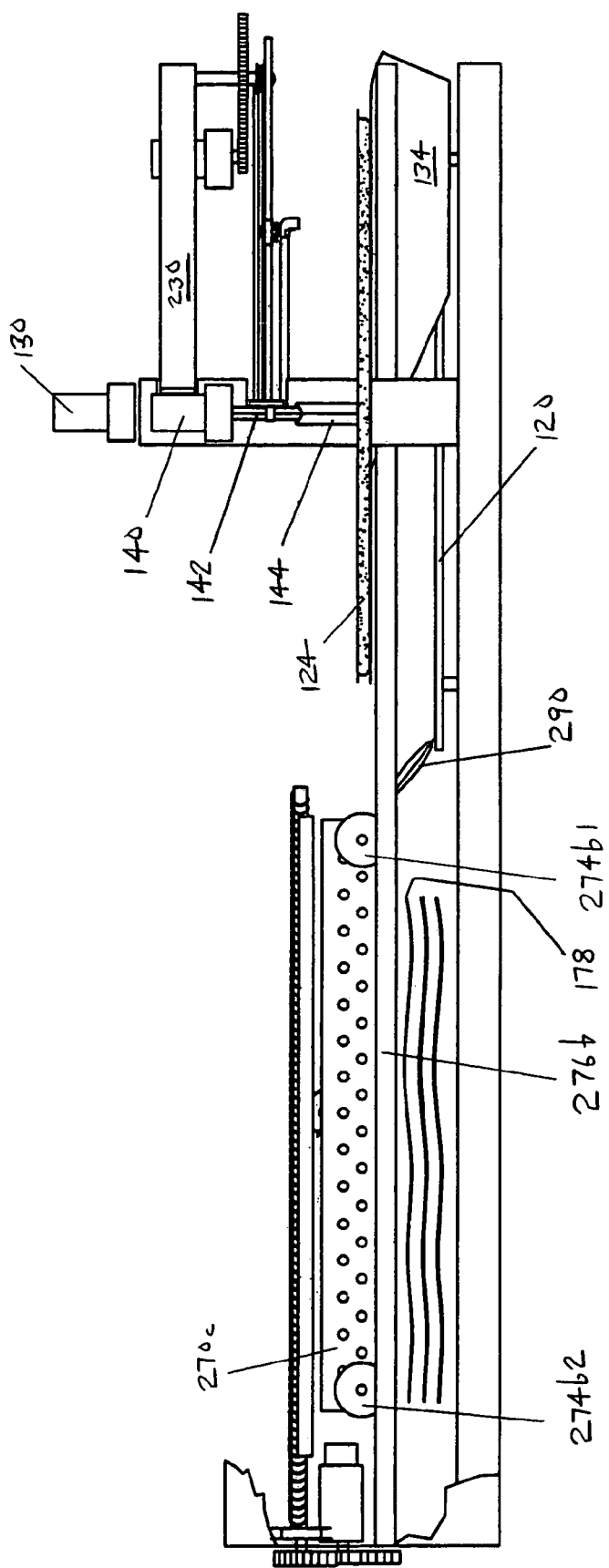
FIG. 24 presents a side view of the invention taken from the right side looking towards the center of the baking surface.

Turning, now, to FIG. 24, a side view of the invention, taken from the right side looking towards the center of the baking surface 122, is shown. This figure similarly clarifies the relative height of several of the invention's components.

The reader is again directed to the relative height of the conveyor 170 as compared to the pan 120 (as well as the polishing pad 124 when it is resting upon the polishing pad landing 136). The angled assembly comprising the spatula 294 and pickup belt 290 is also apparent, bridging as it does the conveyor assembly 108 and the pan 120.

In FIG. 24, one notices once again the stack of injera wafers (including an uppermost injera wafer 178) located at the rearmost portion of the invention.

Figure 25:
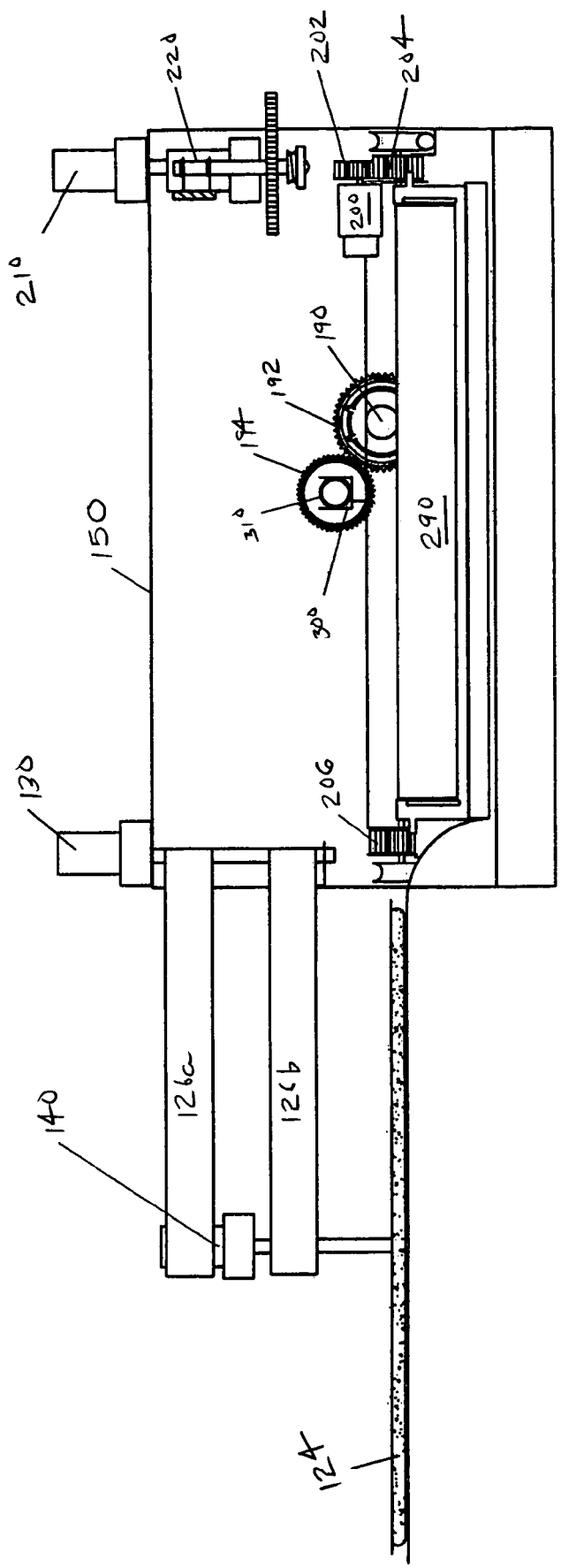
FIG. 25 presents a side view of the invention taken from the front side looking towards the center of the baking surface.

Turning, now, to FIG. 25, a front side view of the invention is shown. This view most clearly depicts the positioning of the conveyor push/pull drive motor 190, and its associated conveyor push/pull drive motor gear 192 and conveyor push/pull drive motor roller gear 194, the roller gear 194 accounting for the rotation of the conveyor push/pull shaft 310. As is clearly depicted in this figure, the conveyor push/pull shaft 310 (a threaded rotating shaft) is inscribed within the conveyor push/pull u-shaped rod 300.

When the conveyor push/pull shaft 310 is rotated in one direction to its natural extreme, the circumscribed conveyor push/pull u-shaped rod 300 is translated forward, and it urges the conveyor 170 (by means of the conveyor push/pull cross-arm 302) along with it. Similarly, when the conveyor push/pull shaft 310 is rotated in the opposite direction to its natural extreme, the circumscribed conveyor push/pull u-shaped rod 300 is translated in a rearward direction, and it retracts the conveyor 170 (by means of the conveyor push/pull cross-arm 302) along with it. Compare FIG. 18 (conveyor 170 translated forward) with FIG. 19 (conveyor 170 translated rearward).

Returning to FIG. 25, certain gears affected by the operation of the conveyor roller drive motor 200 are also apparent. Most obvious is the conveyor roller drive motor gear 202, which is directly driven by the motor 200. The conveyor roller drive motor gear 202, in turn, simultaneously drives conveyor roller drive motor roller gear 204 and conveyor roller drive 206 (which comprises a bank of interlaced gears as described more particularly below in conjunction with FIG. 27).

Figure 26:
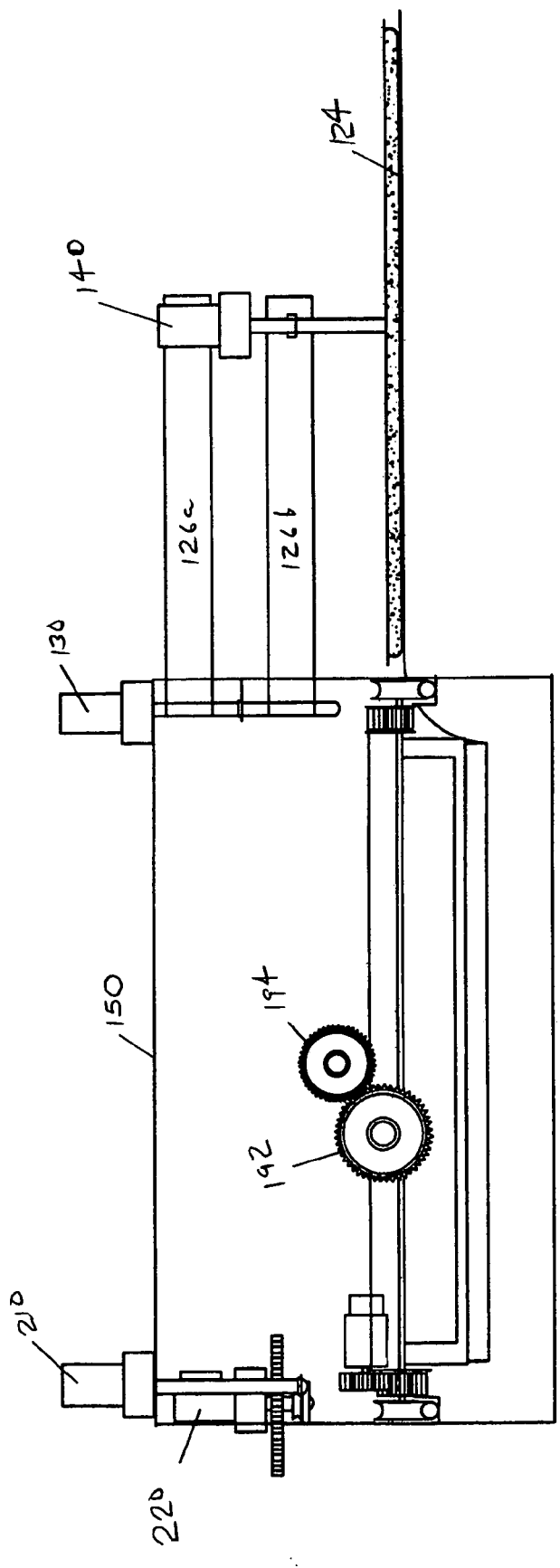
FIG. 26 presents a side view of the invention taken from the rear side looking towards the center of the baking surface.

Turning, now, to FIG. 26, a rear side view of the invention is shown. This view depicts the direct engagement of the conveyor push/pull drive motor gear 192 and the conveyor push/pull drive motor roller gear 194.

Figure 27:
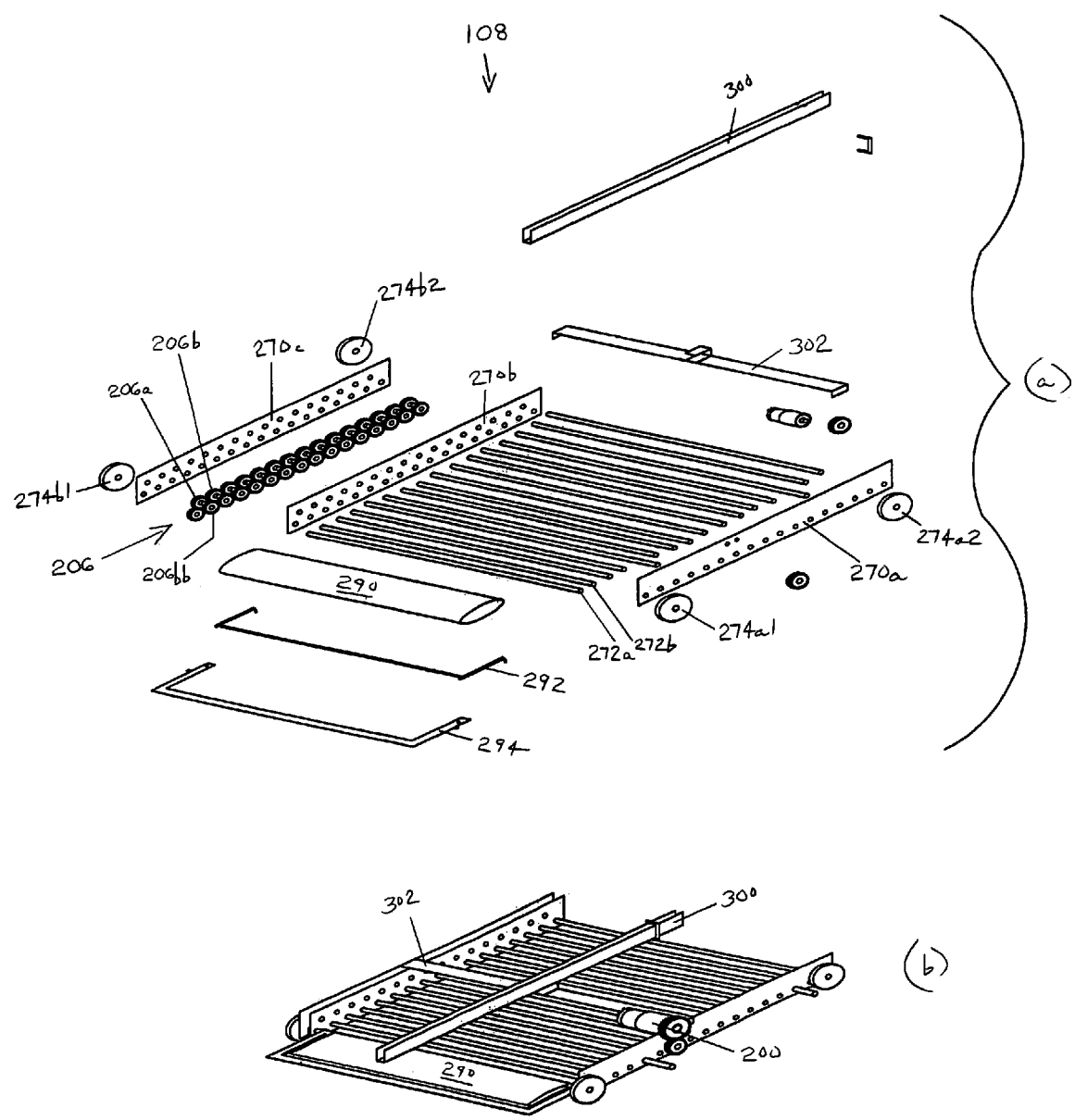
FIG. 27 depicts various view of the conveyor system.

Turning now to FIG. 27, various views of the conveyor system 108 are shown.

In section (a) of FIG. 27, the conveyor system 108 is shown in a disassembled view. The pickup belt 290 is driven by a conveyor roller 272a at the front end of the conveyor 170 and at the interior rear end of pickup belt 290. The spatula attachment 294 has nipples at opposite ends that sits against the conveyor frame side panels 270a, 270b. This prevents the spatula 294 from sliding on to the conveyor surface. There is also a hole next to each nipple where the ends of the belt tensioner 292 is inserted to keep the pick up belt 290 in tension.

The disassembled section of this figure also shows the presence of the conveyor roller drive 206. As shown in the figure, this component is actually a bank of interlaced conveyor roller drive gears. The upper conveyor roller drive gears are designated 206a, 206b, 206c, etc. as one progresses in a rearward direction from the front extremity of the bank; the lower conveyor roller drive gears are given the similar designations 206aa, 206bb, 206 cc, etc. as one progresses in a rearward direction from the front extremity of the bank. The conveyor roller gears are configured such that each interior lower conveyor roller gear is in contact with two interior upper conveyor roller gears (e.g., lower conveyor roller gear 206bb is in contact with upper conveyor roller gears 206a and 206b but not with adjacent lower conveyor roller gears 206aa and 206cc), so that all of the upper conveyor roller gears 206a, 206b, 206c, etc. will rotate simultaneously and in the same direction (i.e., roll forward, roll rearward, accelerate, and decelerate simultaneously and in the same direction, and/or stop simultaneously).

In section (b) of FIG. 27, the conveyor system 108 is shown in an assembled view. The conveyor push/pull cross-arm 302 is shown as being fixedly attached to both the conveyor push/pull u-shaped rod 300 and the conveyor frame side panels 270a, 270c. Furthermore, as is apparent from FIG. 22, the conveyor push/pull cross-arm 302 is positioned well above the conveyor surface and the injera wafers carried there.

Figure 28:
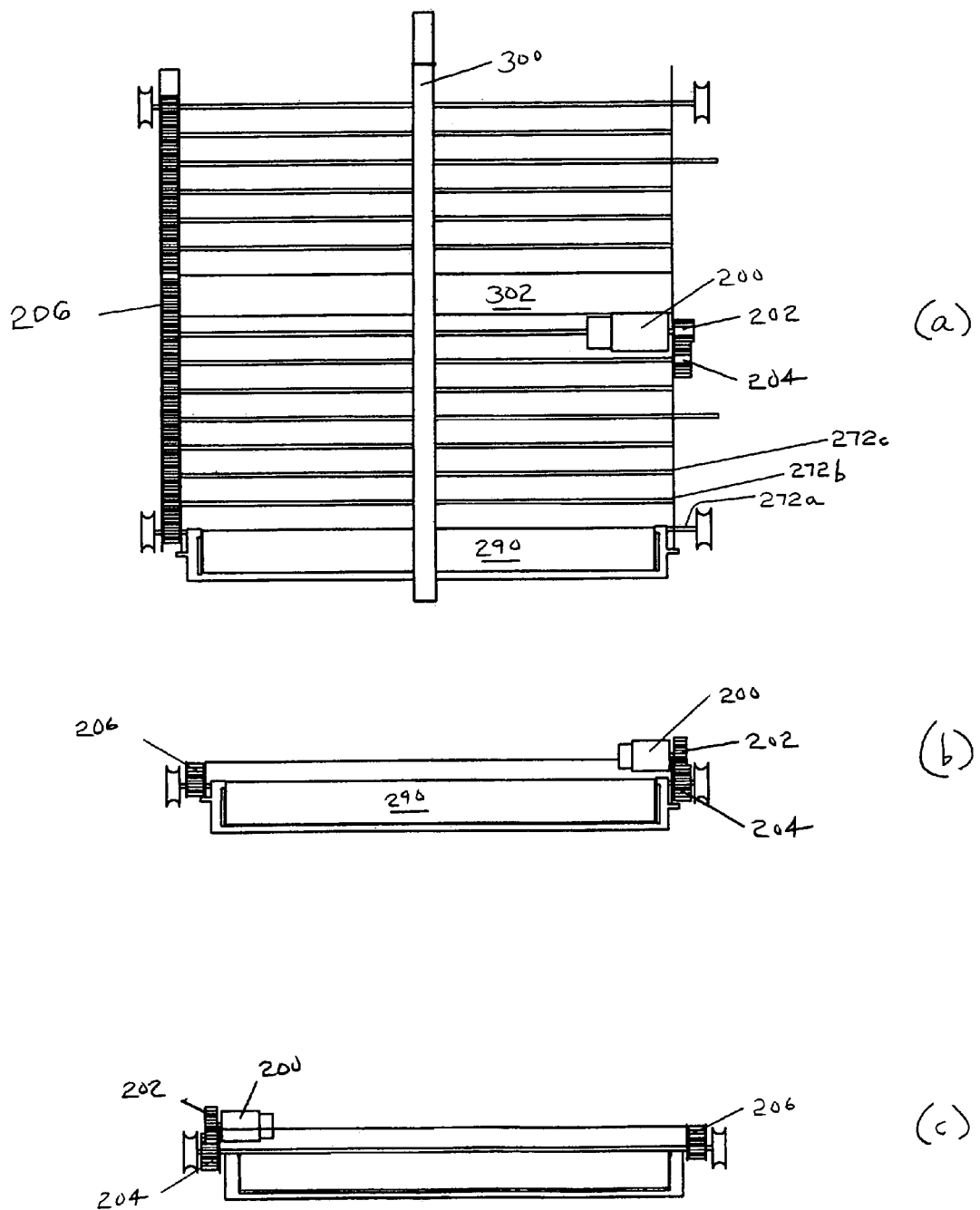
FIG. 28 presents additional views of the conveyor system.

Turning, now, to FIG. 28, various view of the conveyor system are provided.

In section (a) of FIG. 28, a top view of the conveyor system is provided. This view graphically demonstrates the location of the conveyor roller drive 206.

Section (b) of FIG. 28 (a front view of the conveyor system 108) and Section (c) of FIG. 28 (a rear view of the conveyor system 108) clarify the location of the conveyor roller drive 206.

Figure 29:
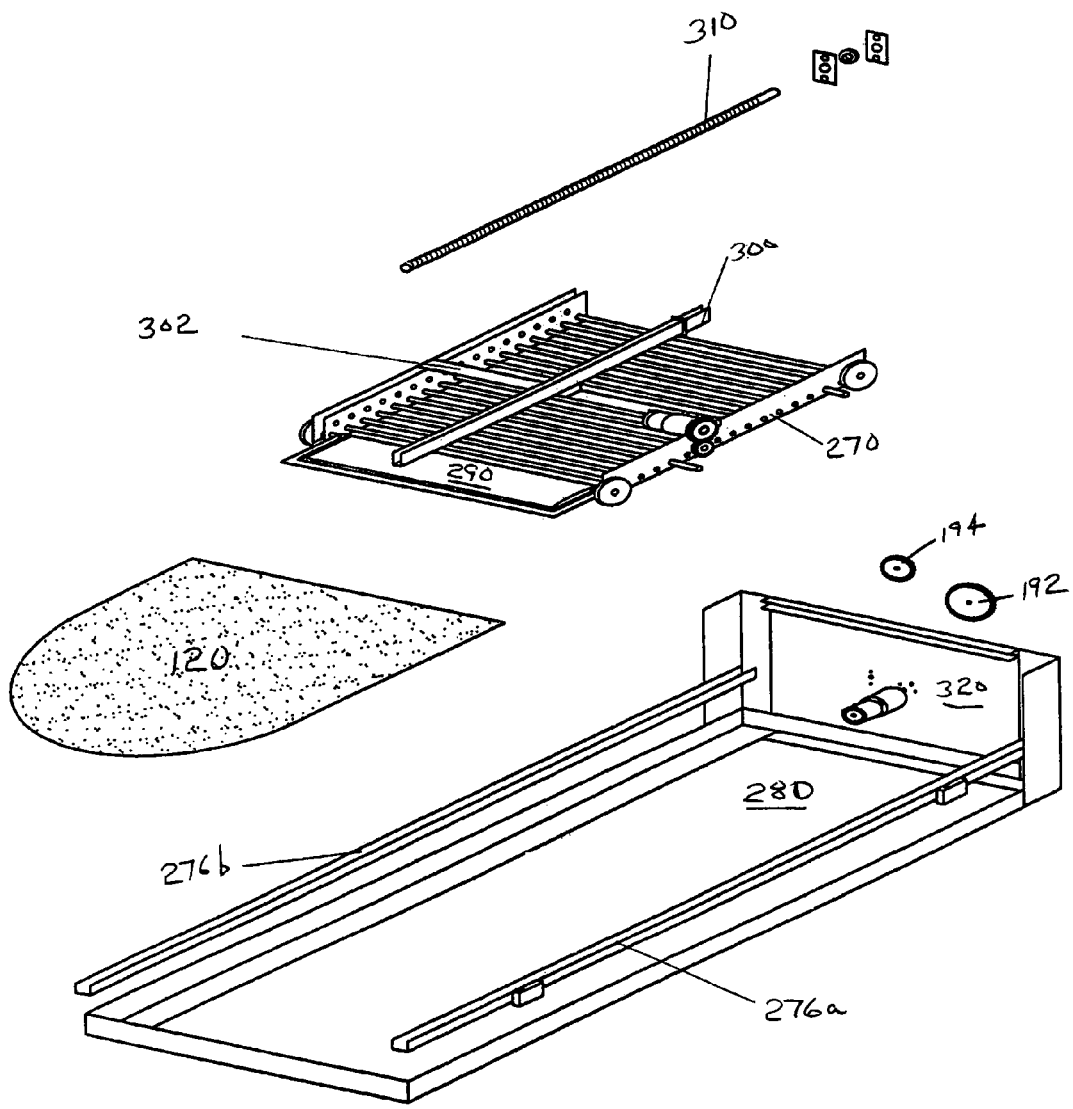
FIG. 29 presents additional views view of the invention's conveyor system as well as the invention housing.

Turning, now, to FIG. 29, an additional view of the invention's conveyor system 108 is shown.

In this figure, a disassembled view of the conveyor system 108 is shown. This view helpfully demonstrates, in particular, the relative positioning of the conveyor push/pull shaft 310 and its relative length vis-à-vis the conveyor push/pull u-shaped rod 300. The conveyor assembly 108 and pan 120 both reside within the invention housing 320. As is apparent from this figure, the conveyor wheels 274 travel within two longitudinal wheel tracks 276, so as to guide the conveyor assembly 108 along a smooth, linear, reciprocating path during operation of the invention 100.

Although the invention has been described with reference to a preferred embodiment, this description should not be construed in a limiting sense. Rather, various improvements, modifications, and additions to the disclosed embodiment, which do not depart from the spirit and scope of the present invention, will become apparent to persons of ordinary skill in the art, and these improvements, modifications and additions, and their equivalents, are to be viewed as being within the ambit of the claimed invention as defined below.

I claim:

1. An injera baking machine comprising:
   (a) a housing comprising a mounting frame;
   (b) a cooking surface supported on said housing;
   (c) a polishing assembly, said polishing assembly secured to said mounting frame, said polishing assembly comprising a polishing pad positionable over said cooking surface when said cooking surface is not in use and a drive to apply said polishing pad to said cooking surface so as to clean said cooking surface prior to the application of an injera batter;
   (d) a batter application assembly, said batter application assembly secured to said mounting frame, said batter application assembly positionable over said cooking surface, said batter application assembly generating a uniform circular pour of said injera batter for cooking on said cooking surface so as to yield an injera wafer; and
   (e) a reciprocating collection/deposition assembly, said reciprocating collection/deposition assembly comprising a reciprocating conveyor comprising conveyor rollers, a drive reciprocating said reciprocating conveyor between a forward position and a rearward position, and a spatula assembly transferring said injera wafer from said cooking surface to the upper surface of said conveyor rollers.

2. The injera baking machine of claim 1 wherein said drive applies said polishing pad to said cooking surface by rotating said polishing pad and applying said rotating polishing pad to said cooking surface.

3. The injera baking machine of claim 1 wherein said batter application assembly comprises a drive to rotate a batter supply line reciprocating nozzle carrier so that said injera batter is deposited upon said cooking surface along a spiral path so as to generate said uniform circular pour of said injera batter.

4. The injera baking machine of claim 3 wherein said batter supply line reciprocating nozzle carrier comprises a windup mechanism to effectuate reciprocation.

5. The injera baking machine of claim 1 further comprising at least one timer to effectuate the automated preparation of said injera wafer.

6. The injera baking machine of claim 1 further comprising a conveyor roller drive rotating said conveyor rollers rearward when said reciprocating conveyor is reciprocated forward.

7. The injera baking machine of claim 6 wherein said conveyor roller drive locks said conveyor rollers whenever said reciprocating conveyor is reciprocated rearward.

8. A bread baking machine comprising:
   (a) a housing comprising a mounting frame;
   (b) a cooking surface supported on said housing;
   (c) a polishing assembly, said polishing assembly secured to said mounting frame, said polishing assembly comprising a polishing pad positionable over said cooking surface when said cooking surface is not in use and a drive to apply said polishing pad to said cooking surface so as to clean said cooking surface prior to the application of a bread batter;
   (d) a batter application assembly, said batter application assembly secured to said mounting frame, said batter application assembly positionable over said cooking surface, said batter application assembly generating a uniform circular pour of said bread batter for cooking on said cooking surface so as to yield a bread wafer; and
   (e) a reciprocating collection/deposition assembly, said reciprocating collection/deposition assembly comprising a reciprocating conveyor comprising conveyor rollers, a drive reciprocating said reciprocating conveyor between a forward position and a rearward position, and a spatula assembly transferring said bread wafer from said cooking surface to the upper surface of said conveyor rollers.

9. The bread baking machine of claim 8 wherein said drive applies said polishing pad to said cooking surface by rotating said polishing pad and applying said rotating polishing pad to said cooking surface.

10. The bread baking machine of claim 8 wherein said batter application assembly comprises a drive to rotate a batter supply line reciprocating nozzle carrier so that said bread batter is deposited upon said cooking surface along a spiral path so as to generate said uniform circular pour of said bread batter.

11. The bread baking machine of claim 10 wherein said batter supply line reciprocating nozzle carrier comprises a windup mechanism to effectuate reciprocation.

12. The bread baking machine of claim 8 further comprising at least one timer to effectuate the automated preparation of said bread wafer.

13. The bread baking machine of claim 8 further comprising a conveyor roller drive rotating said conveyor rollers rearward when said reciprocating conveyor is reciprocated forward.

14. The bread baking machine of claim 13 wherein said conveyor roller drive locks said conveyor rollers whenever said reciprocating conveyor is reciprocated rearward.

15. An injera baking machine comprising:
(a) a housing comprising a mounting frame;
(b) a cooking surface supported on said housing;
(c) a batter application assembly, said batter application assembly secured to said mounting frame, said batter application assembly positionable over said cooking surface, said batter application assembly generating a uniform circular pour of an injera batter for cooking on said cooking surface so as to yield an injera wafer; and
(d) a reciprocating collection/deposition assembly, said reciprocating collection/deposition assembly comprising a reciprocating conveyor comprising conveyor rollers, a drive reciprocating said reciprocating conveyor between a forward position and a rearward position, and a spatula assembly transferring said injera wafer from said cooking surface to the upper surface of said conveyor rollers.

16. The injera baking machine of claim 15 wherein said batter application assembly comprises a drive to rotate a batter supply line reciprocating nozzle carrier so that said injera batter is deposited upon said cooking surface along a spiral path so as to generate said uniform circular pour of said injera batter.

17. The injera baking machine of claim 16 wherein said batter supply line reciprocating nozzle carrier comprises a windup mechanism to effectuate reciprocation.

18. The injera baking machine of claim 15 further comprising at least one timer to effectuate the automated preparation of said injera wafer.

19. The injera baking machine of claim 15 further comprising a conveyor roller drive rotating said conveyor rollers rearward when said reciprocating conveyor is reciprocated forward.

20. The injera baking machine of claim 19 wherein said conveyor roller drive locks said conveyor rollers whenever said reciprocating conveyor is reciprocated rearward.

* * * * *